United States Patent
Yabu et al.

(10) Patent No.: US 9,177,201 B2
(45) Date of Patent: Nov. 3, 2015

(54) IMAGE EVALUATION DEVICE, IMAGE EVALUATION METHOD, PROGRAM, AND INTEGRATED CIRCUIT

(71) Applicant: Panasonic Corporation, Osaka (JP)

(72) Inventors: Hiroshi Yabu, Kyoto (JP); Tomoyuki Karibe, Osaka (JP); Tsutomu Uenoyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 80 days.

(21) Appl. No.: 14/127,022

(22) PCT Filed: Apr. 22, 2013

(86) PCT No.: PCT/JP2013/002706
§ 371 (c)(1),
(2) Date: Dec. 17, 2013

(87) PCT Pub. No.: WO2013/179558
PCT Pub. Date: Dec. 5, 2013

(65) Prior Publication Data
US 2014/0126826 A1    May 8, 2014

(30) Foreign Application Priority Data
May 29, 2012   (JP) .................................. 2012-122236

(51) Int. Cl.
*G06K 9/46* (2006.01)
*G06K 9/66* (2006.01)
(Continued)

(52) U.S. Cl.
CPC ...... *G06K 9/00536* (2013.01); *G06F 17/30247* (2013.01); *G06Q 30/06* (2013.01)

(58) Field of Classification Search
None
See application file for complete search history.

(56) References Cited

U.S. PATENT DOCUMENTS 8,606,776 B2 * 12/2013 Steiner .......................... 707/723
8,832,080 B2 *  9/2014 Zhang ........................... 707/722
(Continued)

FOREIGN PATENT DOCUMENTS

JP    2004-151918    5/2004
JP    2005-346494    12/2005
(Continued)

OTHER PUBLICATIONS

International Search Report issued Jul. 16, 2013 in corresponding International Application No. PCT/JP2013/002706.
(Continued)

*Primary Examiner* — Randolph I Chu
(74) *Attorney, Agent, or Firm* — Wenderoth, Lind & Ponack, L.L.P.

(57) ABSTRACT

An image evaluation device pertaining to the present invention aims to realize evaluations matching the needs of each individual user, with respect to images shared on a network. The image evaluation device includes: image feature extraction unit extracting image features from a plurality of images; evaluation information acquisition unit acquiring evaluation information, the evaluation information containing results of evaluations of the images performed by users including a subject user; generation unit generating relational information based on the image features and the evaluation information, the relational information showing relationship between the images, the users, and image feature groups into which the image features are classified; and image social importance calculation unit calculating an image social importance degree of each image based on the relational information generated by the generation unit, each image social importance degree showing a degree of importance to the subject user of the corresponding image.

15 Claims, 34 Drawing Sheets

(51) Int. Cl.
*G06K 9/00* (2006.01)
*G06Q 30/06* (2012.01)
*G06F 17/30* (2006.01)

(56) References Cited

U.S. PATENT DOCUMENTS

| | | | | |
|---|---|---|---|---|
| 8,861,804 | B1 * | 10/2014 | Johnson et al. | 382/118 |
| 2005/0251411 | A1 * | 11/2005 | Ishii et al. | 705/1 |
| 2006/0036597 | A1 * | 2/2006 | Kobayashi | 707/5 |
| 2011/0317928 | A1 | 12/2011 | Yabu et al. | |

FOREIGN PATENT DOCUMENTS

| | | |
|---|---|---|
| JP | 2006-48320 | 2/2006 |
| JP | 2009-187522 | 8/2009 |
| JP | 4725038 | 7/2011 |
| JP | 4846071 | 12/2011 |

OTHER PUBLICATIONS

David G. Lowe, "Distinctive Image Features from Scale-Invariant Keypoints", International Journal of Computer Vision, Jan. 5, 2004, pp. 1-28.

Gabriella Csurka et al., "Visual Categorization with Bags of Keypoints", Proc. of ECCV Workshop on Statistical Learning in Computer Vision, 2004.

"The PageRank Citation Ranking: Bringing Order to the Web", Page, Lawrence; Brin, Sergey; Motwani, Rajeev and Winograd, Terry, Jan. 29, 1998, pp. 1-17.

* cited by examiner

| Image feature group ID | Image ID | Image feature ID | Image feature (128 dimensions) |
|---|---|---|---|
| 1 | 1 | 1 | (46, 106, 0, 0, 0, 50, 75, 152, 152, 0, 0, 0, ...) |
| 1 | 2 | 2 | (46, 106, 0, 0, 0, 50, 75, 152, 152, 0, 0, 0, ...) |
| 2 | 2 | 3 | (1, 12, 11, 58, 70, 0, 0, 0, 51, 106, 28, 3, 0, ...) |
| 2 | 3 | 4 | (1, 12, 11, 58, 70, 0, 0, 0, 51, 106, 28, 3, 0, ...) |

Image feature group management information storage

FIG. 32

Adjacency matrix M $$M = \begin{pmatrix} 0 & 0.34 & 0.34 & 0.1 & 0.55 & 0.55 & 0.2 & 0.3 & 0.5 & 0.34 & 0.34 \\ 0.1 & 0 & 0 & 0.25 & 0 & 0.25 & 0 & 0 & 0 & 0 & 0 \\ 0.1 & 0 & 0 & 0.25 & 0.25 & 0 & 0 & 0 & 0 & 0 & 0 \\ 0.1 & 0.33 & 0 & 0 & 0 & 0 & 0.3 & 0.3 & 0 & 0 & 0 \\ 0.1 & 0 & 0.33 & 0 & 0 & 0 & 0 & 0 & 0.3 & 0 & 0 \\ 0.1 & 0.33 & 0 & 0 & 0 & 0 & 0.3 & 0 & 0 & 0 & 0 \\ 0.1 & 0 & 0.33 & 0.2 & 0 & 0.2 & 0 & 0 & 0 & 0 & 0 \\ 0.1 & 0 & 0 & 0.2 & 0.2 & 0 & 0 & 0 & 0 & 0.33 & 0 \\ 0.1 & 0 & 0 & 0 & 0 & 0 & 0 & 0 & 0 & 0.33 & 0.33 \\ 0.1 & 0 & 0 & 0 & 0 & 0 & 0.2 & 0.2 & 0 & 0 & 0.33 \\ 0.1 & 0 & 0 & 0 & 0 & 0 & 0 & 0.2 & 0 & 0 & 0 \\ 0.1 & 0 & 0 & 0 & 0 & 0 & 0 & 0 & 0.2 & 0 & 0 \end{pmatrix}$$

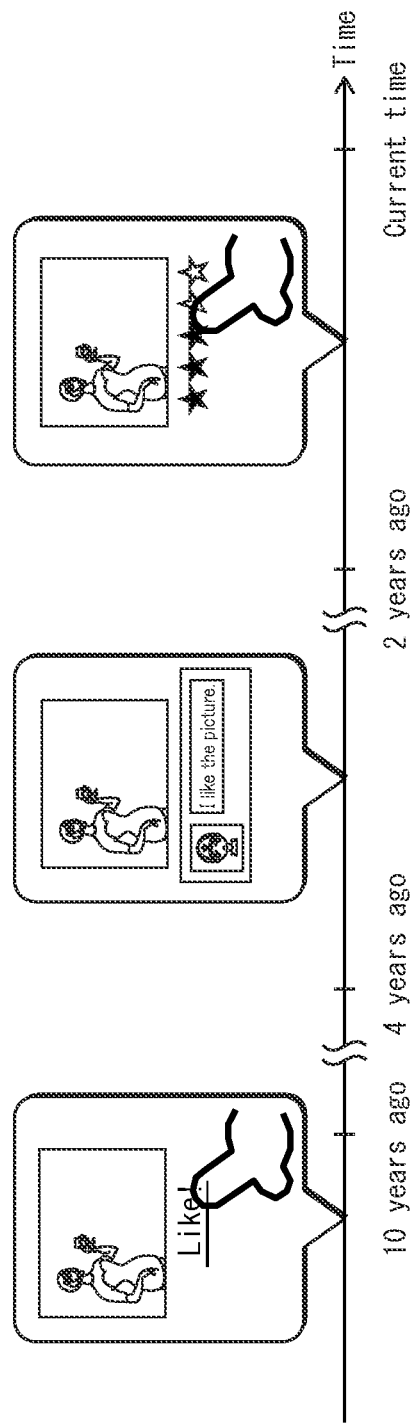

IMAGE EVALUATION DEVICE, IMAGE EVALUATION METHOD, PROGRAM, AND INTEGRATED CIRCUIT

TECHNICAL FIELD

The present invention relates to image evaluation technology for evaluating a plurality of images.

BACKGROUND ART

Due to the spread of digital cameras and the increase in capacity of recording media in recent years, users can now store a vast number of personal contents such as images and movies. In addition, due to the popularization of social networks that can be used for sharing personal contents among users, personal contents are often shared between a user and a friend of the user's, for example.

The popularization of such social networks has been making it difficult for users to appreciate a vast number of images that are shared among users every day. Therefore, a user could miss images that are personally important to the user. For this reason, there is a demand for image evaluation technology that allows users to efficiently browse shared images.

As a conventional method for image evaluation, there has been a method of evaluating images shared among users by calculating an evaluation value for each of the images according to the number of votes for each image (evaluation on each image) (See Patent Literature 1).

CITATION LIST

Patent Literature

[Patent Literature 1] Japanese Patent Application Publication No. 2004-151918

Non-Patent Literature

[Non-Patent Literature 1] David G. Lowe, "Distinctive image features from scale-invariant keypoints", Journal of Computer Vision, 60, 2, pp. 91-110, 2004.

[Non-Patent Literature 2] G. Csurka, C. Bray, C. Dance, and L, Fan, "Visual Categorization with Bags of Keypoints", Proc. of ECCV Workshop on Statistical Learning in Computer Vision, pp. 1-22 (2004).

[Non-Patent Literature 3] "The PageRank citation ranking: Bringing order to the Web", Page, Lawrence; Brin, Sergey; Motwani, Rajeev; and Winograd, Terry (1999).

SUMMARY OF INVENTION

Technical Problem

The image evaluation technology discussed in Patent Literature 1, however, has a problem that any images that have been highly reputed (i.e. rated high) among general users are given high evaluation values irrespective of evaluation by each individual user, and accordingly, images that are important to a particular user can be not rated high.

The present invention is made in view of the above-described problem, and aims to provide an image evaluation device, image evaluation method, program and integrated circuit for performing image evaluation that matches the needs of each individual user.

Solution to Problem

To solve the problem described above, the present invention provides an image evaluation device comprising: an image feature extraction unit that extracts image features from a plurality of images; an evaluation information acquisition unit that acquires evaluation information, the evaluation information containing results of evaluations of the images performed by users including a subject user; a generation unit that generates relational information based on the image features and the evaluation information, the relational information showing relationship between the images, the users, and image feature groups into which the image features are classified; and an image social importance calculation unit that calculates an image social importance degree of each image based on the relational information generated by the generation unit, each image social importance degree showing a degree of importance to the subject user of the corresponding image.

Advantageous Effects of Invention

An image evaluation device pertaining to the present invention performs image evaluation that matches the needs of each individual user.

BRIEF DESCRIPTION OF DRAWINGS

FIG. 32 shows adjacency matrix M pertaining to Embodiment 2.

FIG. 35 shows an example of evaluation method pertaining to Modification.

DESCRIPTION OF EMBODIMENTS

Background Leading to Invention

According to the image evaluation technology discussed in Patent Literature 1, users vote for their favorite images from among images on a network or the like, and the images are evaluated by calculating an evaluation value for each image according to the number of votes for it. Therefore, according to the image evaluation technology discussed in Patent Literature 1, any images that have been highly reputed (i.e. rated high) among general users are given high evaluation values. However, since users have different tastes, images that are popular among general users are not necessarily important to a particular individual user. Therefore, this image evaluation technology has a problem that images that are really important to a particular user are underestimated and the user misses such images.

After due consideration of the above-described problem, the inventors of the present invention have found that users, when evaluating an image, are focusing on specific features contained in the image (e.g., objects captured in the image). Based on the above-described findings, the inventors have further found that features commonly contained in the images that have been evaluated by a user are important to the user, and images containing such important features are important to the user. These findings have led to the present invention.

Image evaluation processing pertaining to the present invention involves calculation of importance degrees of image features contained in an image according to evaluation information, which is the results of image evaluations conducted in the past by a subject user and link users. The subject user is the user for whom the image evaluation pertaining to the present invention is to be performed, and the link users are the users who share images with the subject user. By considering the evaluation information of not only the subject user but also the link users, it is possible to realize image evaluation that matches the needs of the subject user even when there are a vast number of images to be evaluated or the evaluation information of the subject user is insufficient.

1. Embodiment 1

Embodiment 1 relates to an image evaluation device that treats images on a social network, and that evaluates the images for each individual user.

The following describes Embodiment 1 with reference to the drawings.

<1-1. Structure>

Figure 1:
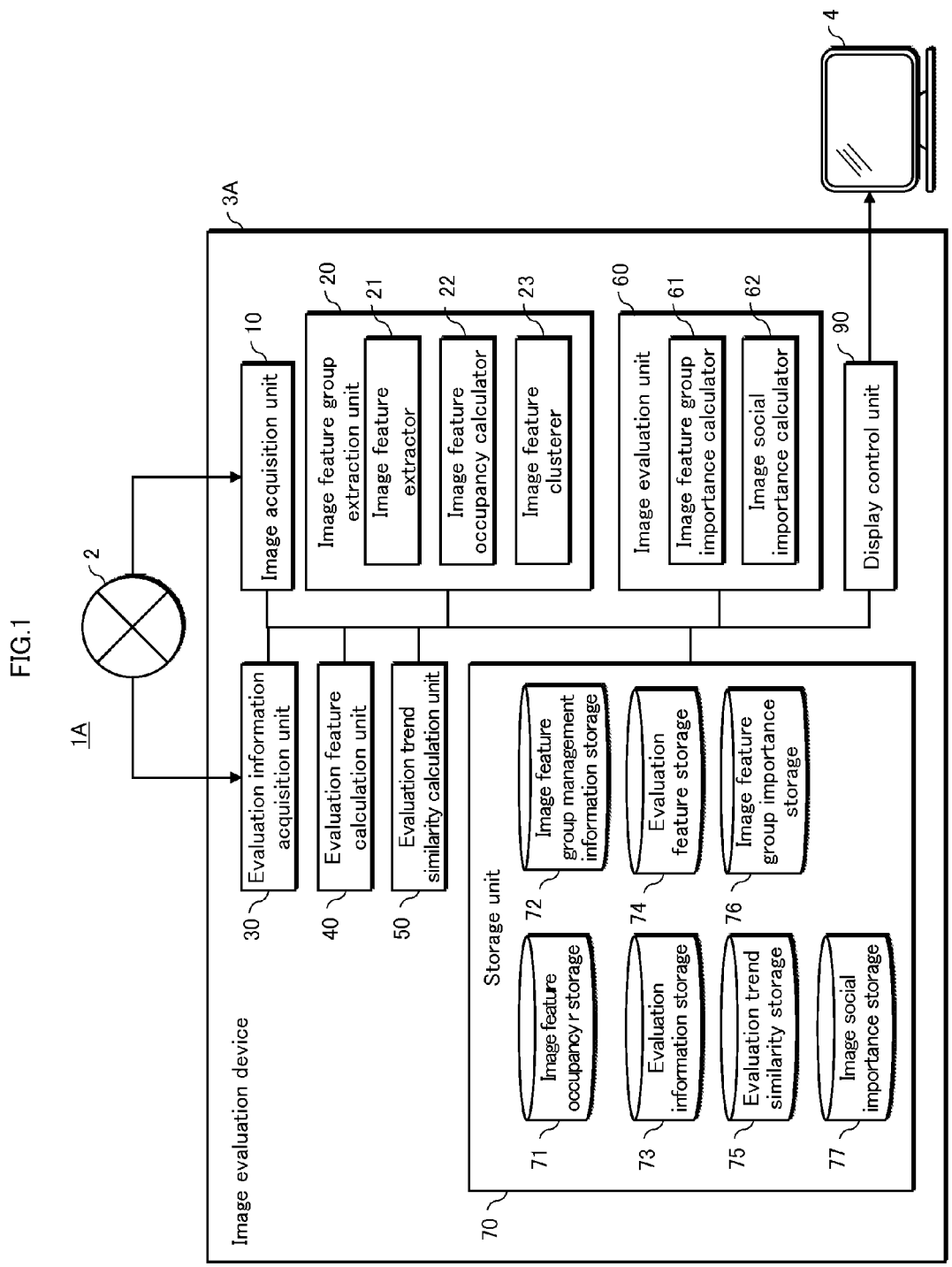
FIG. 1 is a block diagram of an image evaluation system pertaining to Embodiment 1.

FIG. 1 is a block diagram of an image evaluation system 1A pertaining to Embodiment 1.

As shown in FIG. 1, the image evaluation system 1A includes a network 2, an image evaluation device 3A and a display 4.

The image evaluation device 3A includes an image acquisition unit 10, an image feature group extraction unit 20, an evaluation information acquisition unit 30, an evaluation feature calculation unit 40, an evaluation trend similarity calculation unit 50, an image evaluation unit 60, a storage unit 70 and a display control unit 90.

The image acquisition unit 10 acquires images shared on the account of the subject, user from the network 2.

The image feature group extraction unit 20 has functions to extract image features, to calculate image feature occupancy degrees, and to perform clustering in order to classify the image features into image feature groups. The image feature group extraction unit 20 includes an image feature extractor 21, an image feature occupancy calculator 22, and an image feature clusterer 23.

Note that the term "image feature" means a feature of an object (e.g., a person, a thing) contained in an image.

The term "image feature group" means a group of image features.

Note that any image feature contained in an image feature group can be a feature of a part of an object to be extracted, instead of being a feature of the entire body of an object.

Each "image feature occupancy degree" indicates an occupancy ratio of an object, from which a feature is to be extracted, relative to the area containing the object.

The image feature extractor 21 extracts features from image data acquired by the image acquisition unit 10. Extraction of SIFT features may be adapted to the extraction of image features from an image. For the extraction of SIFT features, see Non-Patent Literature 1.

The image feature occupancy calculator 22 calculates image feature occupancy degrees with respect to the image features extracted by the image feature extractor 21, and stores the image feature occupancy degrees thus calculated into an image feature occupancy storage 71.

The image feature clusterer 23 performs clustering on the image features extracted by the image feature extractor 21 so as to classify the image features into image feature groups according to similarity. A classification method according to Bag of Keypoints may be adapted to the clustering of the image features. For the classification method according to Bag of Keypoints, see Non-Patent Literature 2.

After the clustering, the image feature clusterer 23 stores image feature group management information, which is composed of the image feature groups resulting from the clustering and information of the image features contained in the images used in the clustering, into an image feature group management information storage 72.

Note that "image feature group management information" identifies which image feature group each image feature has been clustered into, which image each image feature has been extracted from, and specifies the data (128-dimensional) of each image feature.

The evaluation information acquisition unit 30 acquires evaluation information of the users from the network 2.

The "evaluation information" shows the results of image evaluation conducted by the subject user and the link users who share images with the subject user, with respect to the images shared on the account of the subject user.

The evaluation feature calculation unit 40 calculates evaluation features from the evaluation information acquired by the evaluation information acquisition unit 30. Each evaluation feature represents a trend in the results of the image evaluation by the corresponding user. Furthermore, the evaluation feature calculation unit 40 stores the evaluation features thus calculated into an evaluation feature storage 74, and the evaluation information acquired by the evaluation information acquisition unit 30 into an evaluation information storage 73.

Each "evaluation feature" is evaluation information of a user with respect to each of the images evaluated by the user, and this information is represented in the form of a feature.

The evaluation trend similarity calculation unit 50 calculates evaluation trend similarity degrees of the evaluation features stored in the evaluation feature storage 74, with respect to all the combinations of the subject user and the link users. Then, the evaluation trend similarity calculation unit 50 stores the evaluation trend similarity degrees into an evaluation trend similarity storage 75.

Each "evaluation trend similarity degree" is a value that increases as the similarity between the trend in the results of image evaluations performed by the subject user and the trend in the results of image evaluations performed by a link user.

The image evaluation unit 60 has a function to calculate image feature group importance degrees and image social importance degrees, and includes an image feature group importance calculator 61 and an image social importance calculator 62.

The image feature group importance calculator 61 acquires the image feature group management information stored in the image feature group management information storage 72, the evaluation information stored in the evaluation information storage 73, and the evaluation trend similarity degrees stored in the evaluation trend similarity storage 75. Furthermore, the image feature group importance calculator 61 calculates an image feature group importance degree for each image feature group according to the acquired information, and stores the image feature group degrees thus calculated into an image feature group importance storage 76.

Each "image feature group importance degree" indicates how important an image feature group is to the subject user. The image feature group importance degree of an image feature group increases as the image feature group contains many image features that are contained in images that have been evaluated by the subject user or link users whose evaluation results have a similar trend to those of the subject user. The image feature group importance degrees are used for calculating image social importance degrees. That is, the image feature group importance degrees show the relationship between the images, the users and the image feature groups.

The image social importance calculator 62 acquires the image feature group management information stored in the image feature group management information storage 72, the image feature group importance degrees stored in the image feature group importance storage 76, and the image feature occupancy degrees stored in the image feature occupancy storage 71. Furthermore, the image social importance calculator 62 calculates an image social importance degree for each image according to the acquired information, and stores the image social importance degrees thus calculated into an image social importance storage 77.

Each "image social importance degree" indicates how important an image is for the subject user. The image social importance degree of an image will be relatively high when the image feature contained in the image has a high image feature group importance degree and the object, from which the image feature has been extracted, has a high occupancy degree with respect to the area containing the object.

The storage unit 70 has a function to store various kinds of information, and includes the image feature occupancy storage 71, the image feature group management information storage 72, the evaluation information storage 73, the evaluation feature storage 74, the evaluation trend similarity storage 75, the image feature group importance storage 76 and the image social importance storage 77. The storage unit 70 may be made up from a RAM (Random Access Memory) or an HDD (Hard Disk Drive).

The display control unit 90 acquires the image social importance degrees stored in the image social importance storage 77, and preferentially displays images with high image social importance degrees on the screen of the display.

The image feature group extraction unit 20, the evaluation feature calculation unit 40, the evaluation trend similarity calculation unit 50, the image evaluation unit 60 and so on can be made up from a CPU (Central Processing Unit) executing a control program stored in a ROM (Read Only Memory), for example.

<1-2. Operations>

The following describes operations of the image evaluation device 3A pertaining to Embodiment 1.

Figure 2:
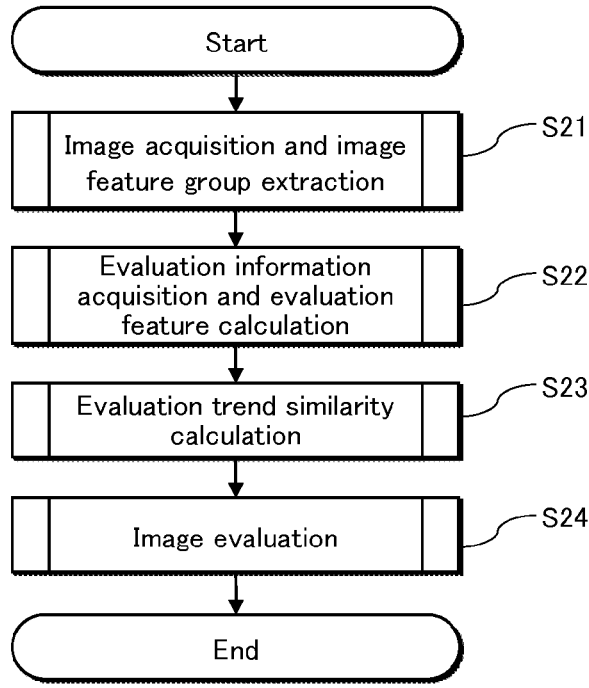
FIG. 2 shows an entire flowchart pertaining to Embodiment 1.

FIG. 2 is a flowchart showing image evaluation processing performed by the image evaluation device 3A shown in FIG. 1. The image evaluation device 3A shown in FIG. 1 sequentially performs image acquisition and image feature group extraction (S21), evaluation information acquisition and evaluation feature calculation (S22), evaluation trend similarity calculation (S23) and image evaluation (S24).

Figure 3:
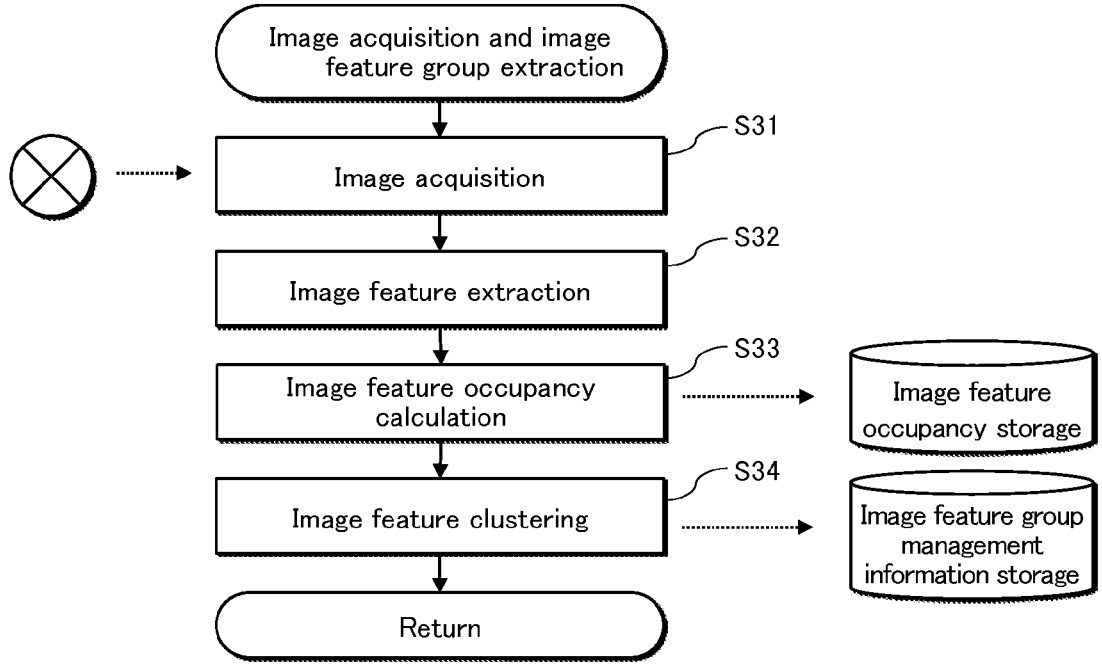
FIG. 3 is a flowchart of image acquisition and image feature group extraction pertaining to Embodiment 1.
Figure 4:
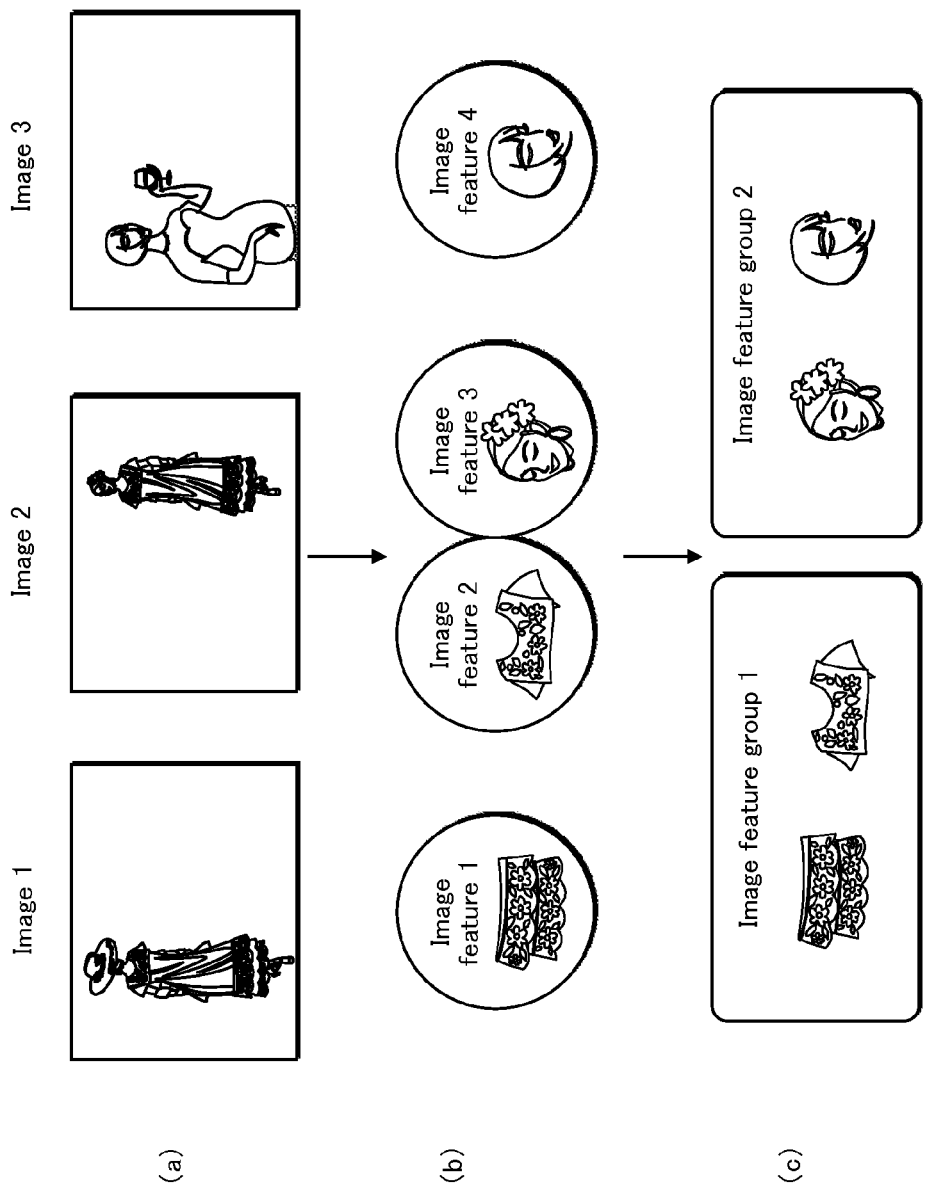
FIG. 4 shows an example of image feature extraction and image feature clustering.

Step S21 (image acquisition and image feature group extraction) shown in FIG. 2 is described with reference to FIG. 3 and a specific example (FIG. 4).

First, the image acquisition unit 10 acquires image data of images 1 through 3 (Section (a) of FIG. 4) shared on the account of the subject user, from the network 2 (FIG. 3: S31).

Next, the image feature extractor 20 extracts image features 1 through 4 (Section (b) of FIG. 4) from the image data of the images 1 through 3 acquired by the image acquisition unit 10 (FIG. 3: S32). In Section (b) of FIG. 4, the image features are represented as objects from which the image features are to be extracted. In the subsequent drawings, image features are represented in the same manner.

Next, the image feature occupancy calculator 22 calculates the image feature occupancy degrees of the image features 1 through 4 extracted by the image feature extractor 20, and stores the image feature occupancy degrees thus calculated into the image feature occupancy storage 71 (FIG. 3: S33). Each image feature occupancy degree indicates the occupancy ratio of the object from which the corresponding image feature has been extracted, relative to the area containing the object.

Figure 5:
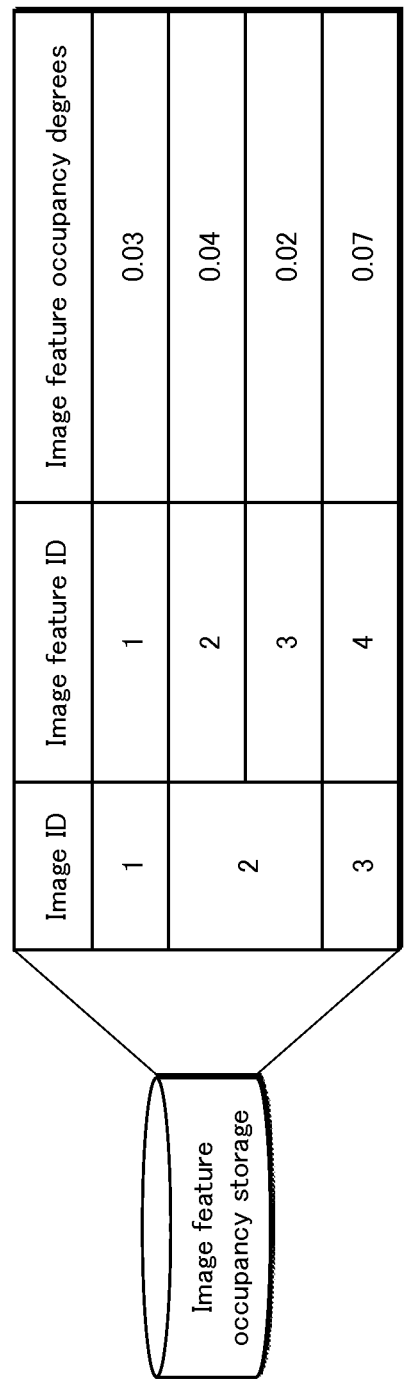
FIG. 5 shows the structure of data stored in an image feature occupancy storage pertaining to Embodiment 1.

The structure of the data stored in the image feature occupancy storage 71 is shown in FIG. 5. As shown in FIG. 5, the data stored in the image feature occupancy storage 71 contains image IDs, image feature IDs and image feature occupancy degrees.

Next, the image feature clusterer 23 determines the image feature 1 and the image feature 2 as similar image features from among the image features 1 through 4 extracted by the image feature extractor 21, and classifies them into an image feature group 1 (Section (c) of FIG. 4), and similarly, the image feature clusterer 23 determines the image feature 3 and the image feature 4 as similar image features, and classifies them into an image feature group 2 (Section (c) of FIG. 4) (FIG. 3: S34). Finally, the image feature extractor 21 stores the image feature group management information, which is composed of the image feature groups 1 and 2 resulting from the clustering and information of the image features 1 through 4 used in the clustering, into the image feature group management information storage 72.

Figure 6:
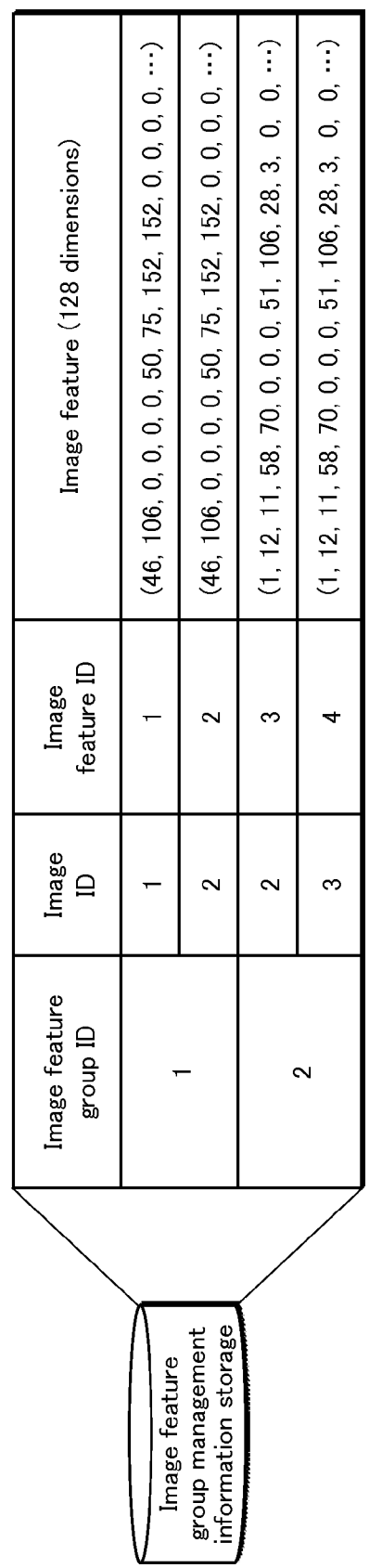
FIG. 6 shows the structure of image feature group management information pertaining to Embodiment 1.

The structure of the data stored in the image feature group management information storage 72 is shown in FIG. 6. As shown in FIG. 6, the data stored in the image feature group management information storage 72 contains image feature group IDs, image IDs, image feature IDs and image features.

Figure 7:
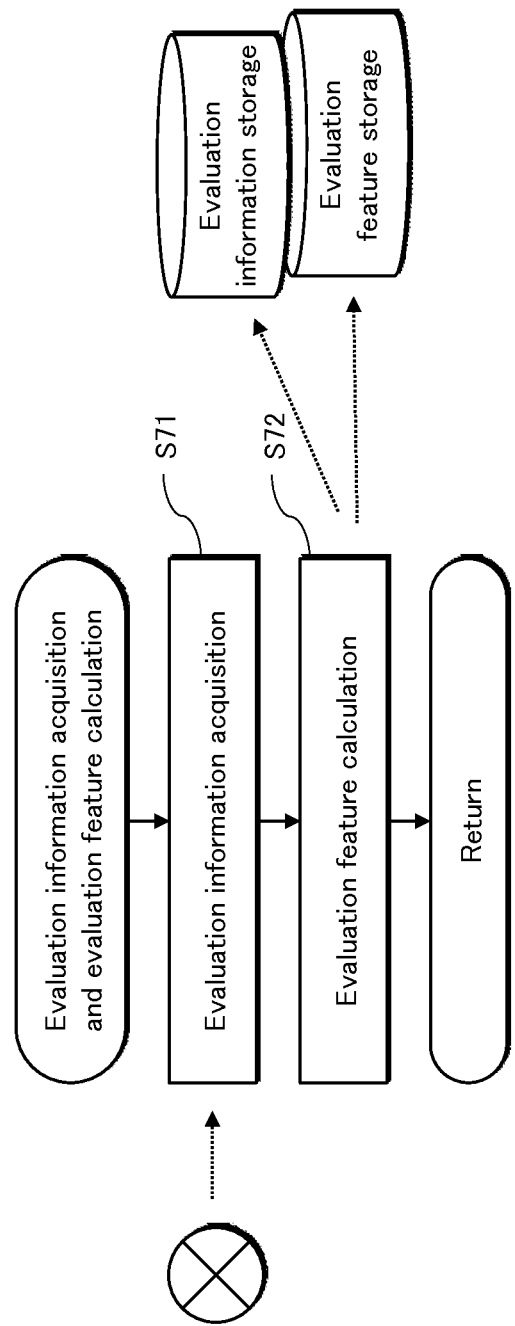
FIG. 7 is a flowchart of evaluation acquisition and evaluation feature calculation pertaining to Embodiment 1.
Figure 8:
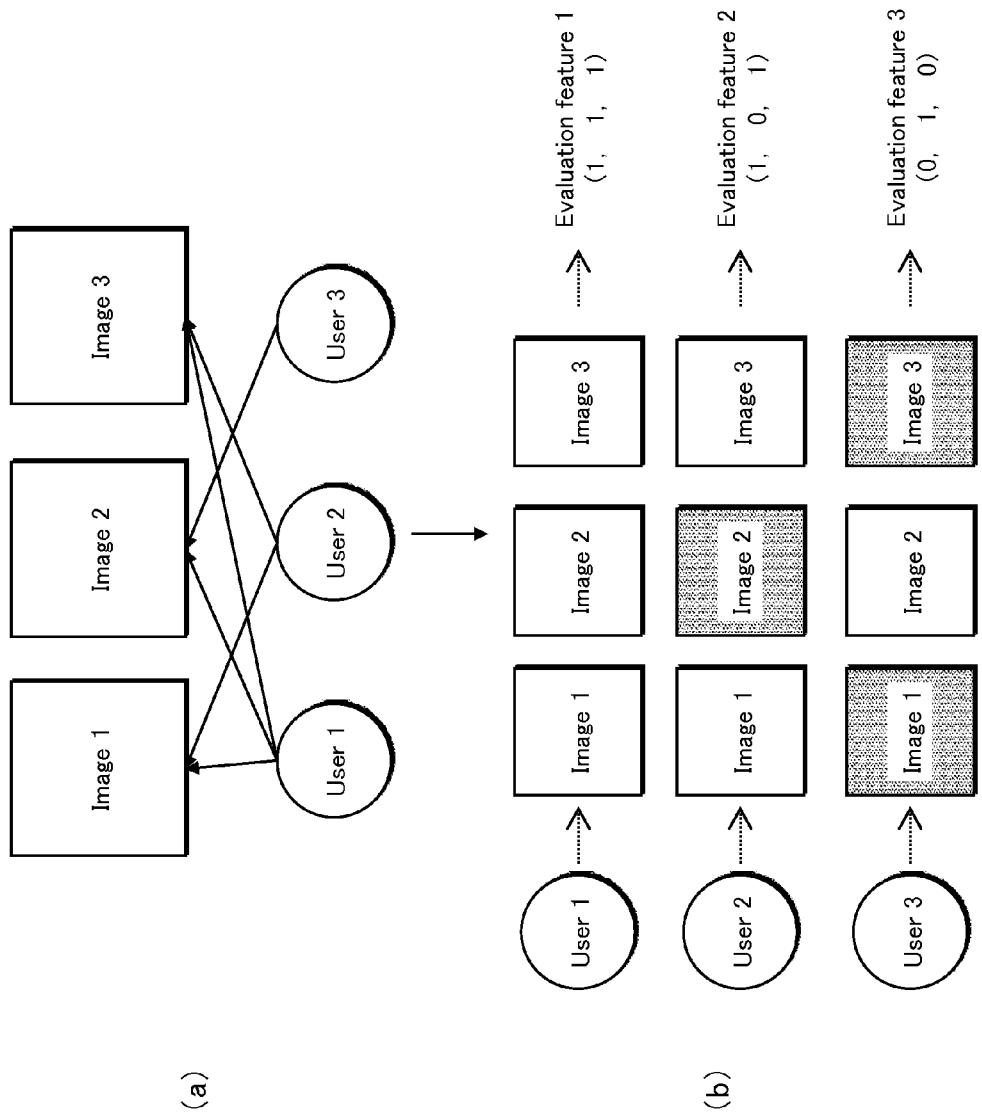
FIG. 8 shows an example of evaluation feature calculation pertaining to Embodiment 1.

Step S22 (evaluation information acquisition and evaluation feature calculation) shown in FIG. 2 is described with reference to FIG. 7 and a specific example (FIG. 8).

The evaluation information acquisition unit 30 acquires the evaluation information of users 1 through 3 with respect to the images 1 through 3 (Section (a) of FIG. 8) from the network (FIG. 7: S71).

Next, the evaluation feature calculation unit 40 calculates evaluation features 1 through 3 according to the evaluation information of the users 1 through 3 acquired by the evaluation information acquisition unit 30 (Section (b) of FIG. 8), and stores the evaluation features 1 through 3 thus calculated into the evaluation feature storage 74, and the evaluation information of the users 1 through 3 acquired by the evaluation information acquisition unit 30 into the evaluation information storage 73 (FIG. 7: S72).

Figure 9:
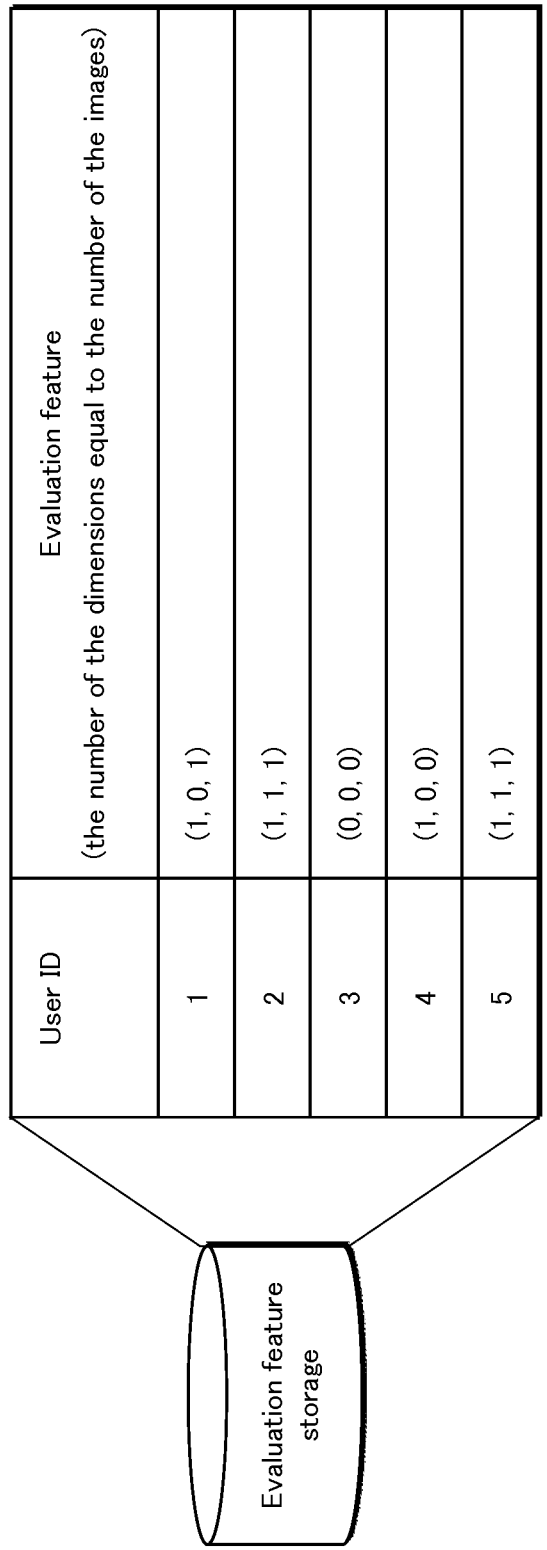
FIG. 9 shows a data structure of evaluation features pertaining to Embodiment 1.

The structure of the data stored in the evaluation feature storage 74 is shown in FIG. 9. As shown in FIG. 9, the data stored in the evaluation feature storage 74 contains user IDs and evaluation features.

Figure 10:
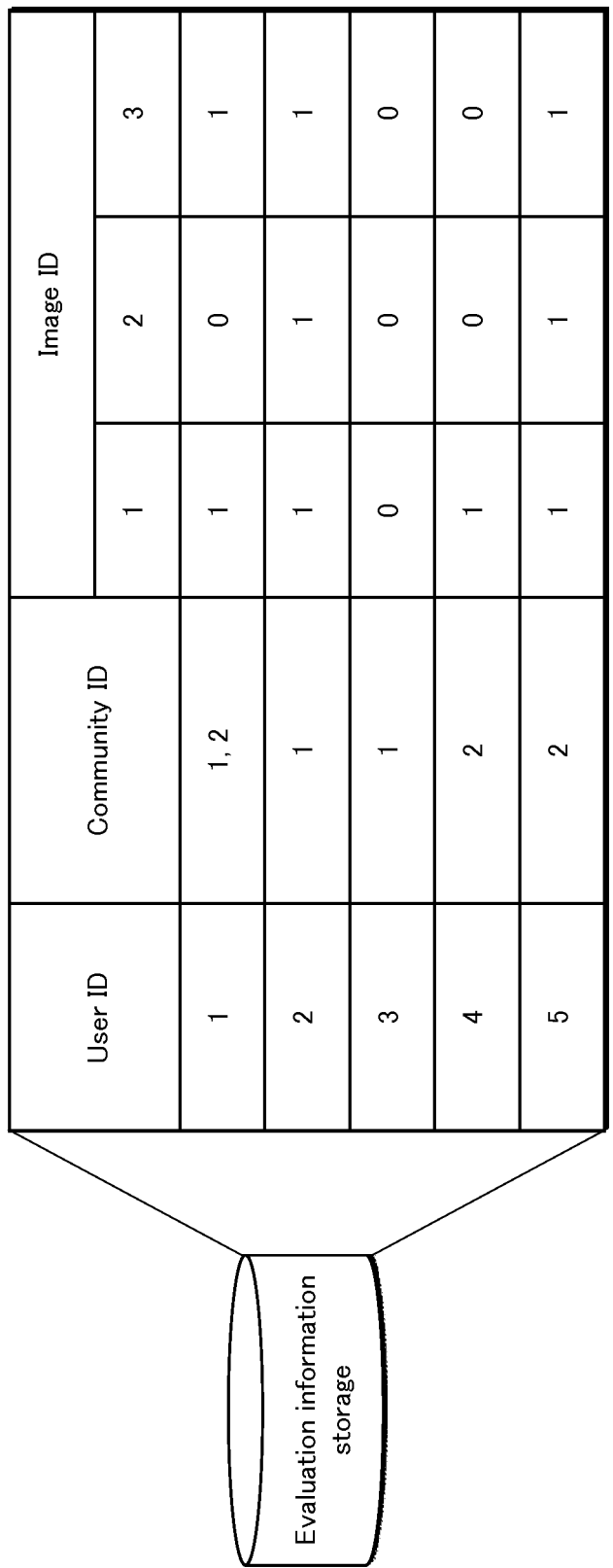
FIG. 10 shows a data structure of evaluation information pertaining to Embodiment 1.

The structure of the data stored in the evaluation information storage 73 is shown in FIG. 10. As shown in FIG. 10, the data stored in the evaluation information storage 73 contains user IDs, community IDs of communities to which the users belong, and image IDs.

Figure 11:
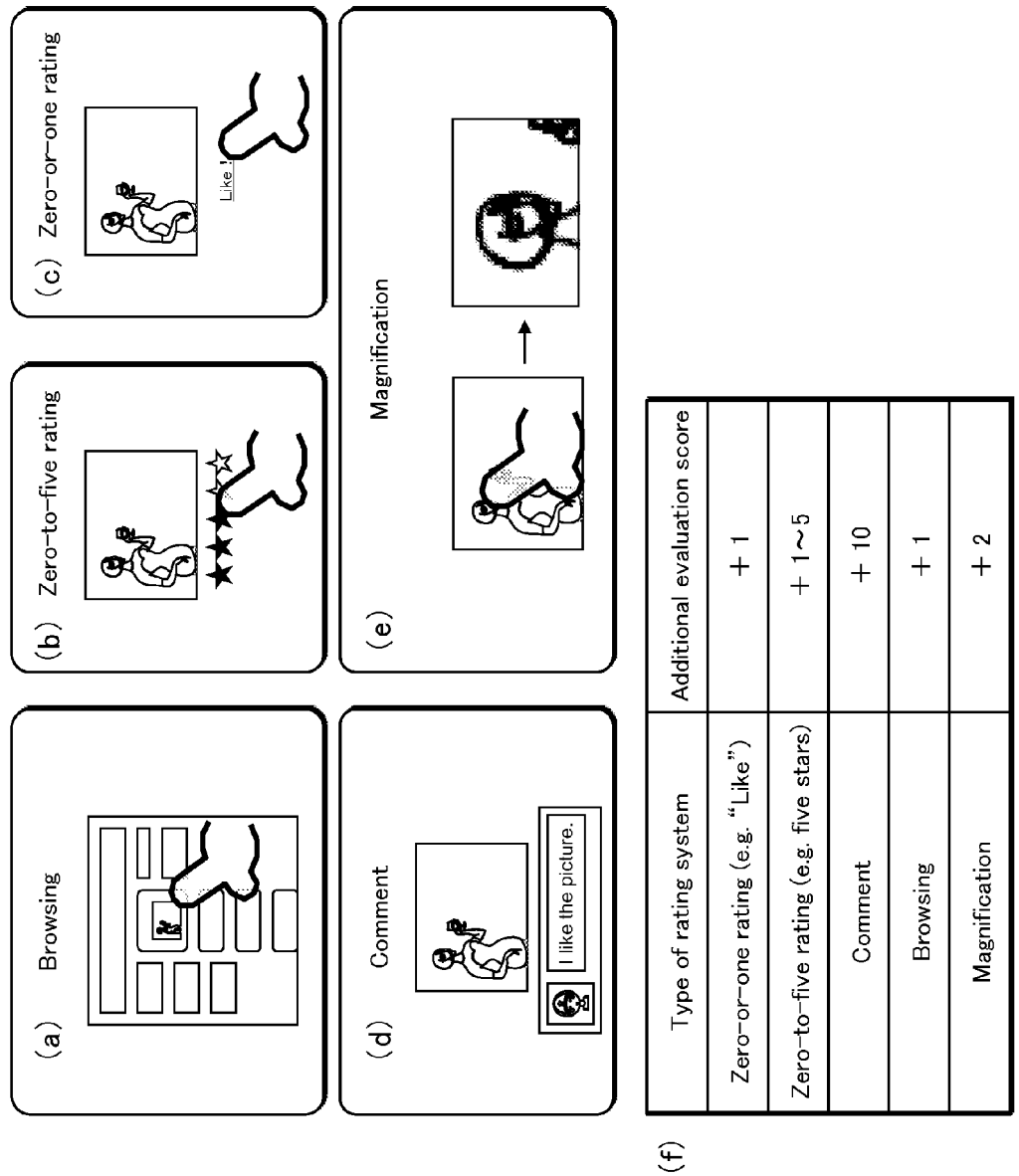
FIG. 11 shows an example of evaluation method pertaining to Embodiment 1.

In the specific example (FIG. 8), each image is rated at "1" (i.e. evaluation has been conducted) or "0" (i.e. evaluation has not been conducted) by the users 1 through 3. However, the way of rating is not limited to this. FIG. 11 shows specific examples of image rating system, as reference. Examples of image rating system include: a rating system based on a user operation of browsing an image (Section (a) of FIG. 11); a zero-to-five rating system using stars for example (Section (b) of FIG. 11); a zero-or-one rating system using a "like" button for example (Section (c) of FIG. 11); a rating system based on a user operation of commenting on an image (Section (d) of FIG. 11); and a rating system based on a user operation of magnifying a part of an image (Section (e) of FIG. 11). Each system may be adapted for determining an evaluation score on a different scale (Section (f) of FIG. 11). In addition, it is possible to obtain more detailed evaluation information by combining the evaluation scores of these rating systems.

Figure 12:
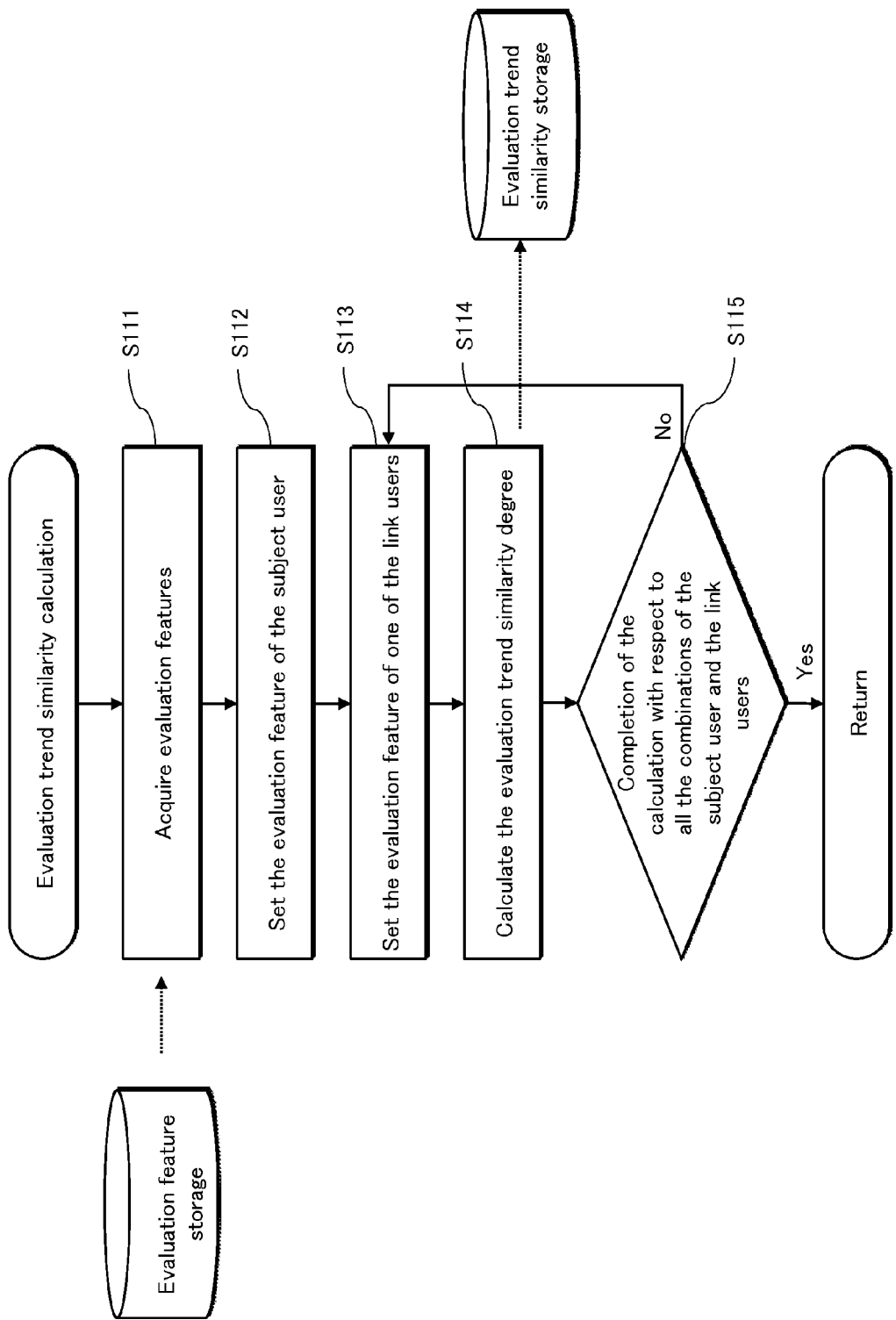
FIG. 12 is a flowchart of evaluation trend similarity calculation pertaining to Embodiment 1.

Step S23 (evaluation trend similarity calculation) shown in FIG. 2 is described with reference to FIG. 12.

The evaluation trend similarity calculation unit 50 acquires the evaluation features from the evaluation feature storage 74 (S111). Next, by using the evaluation features thus acquired, the evaluation trend similarity calculation unit 50 sets the evaluation feature of the subject user (S112), and sets the evaluation feature of one of the link users (S113). Subsequently, the evaluation trend similarity calculation unit 50 calculates the evaluation trend similarity degree between the two evaluation features, and stores the evaluation trend similarity degree thus calculated into the evaluation trend similarity storage 75 (S114).

At this point, if the evaluation trend similarity calculation unit 50 is not yet completed the calculation of the evaluation trend similarity degrees with respect to all the combinations of the subject user and the link users (S115: No), the evaluation trend similarity calculation unit 50 returns to the setting of the evaluation feature of one of the link users (S113), and repeatedly performs the calculation of the evaluation trend similarity degree until the completion of the calculation with respect to all the combinations of the subject user and the link users (S115: Yes).

Figure 13:
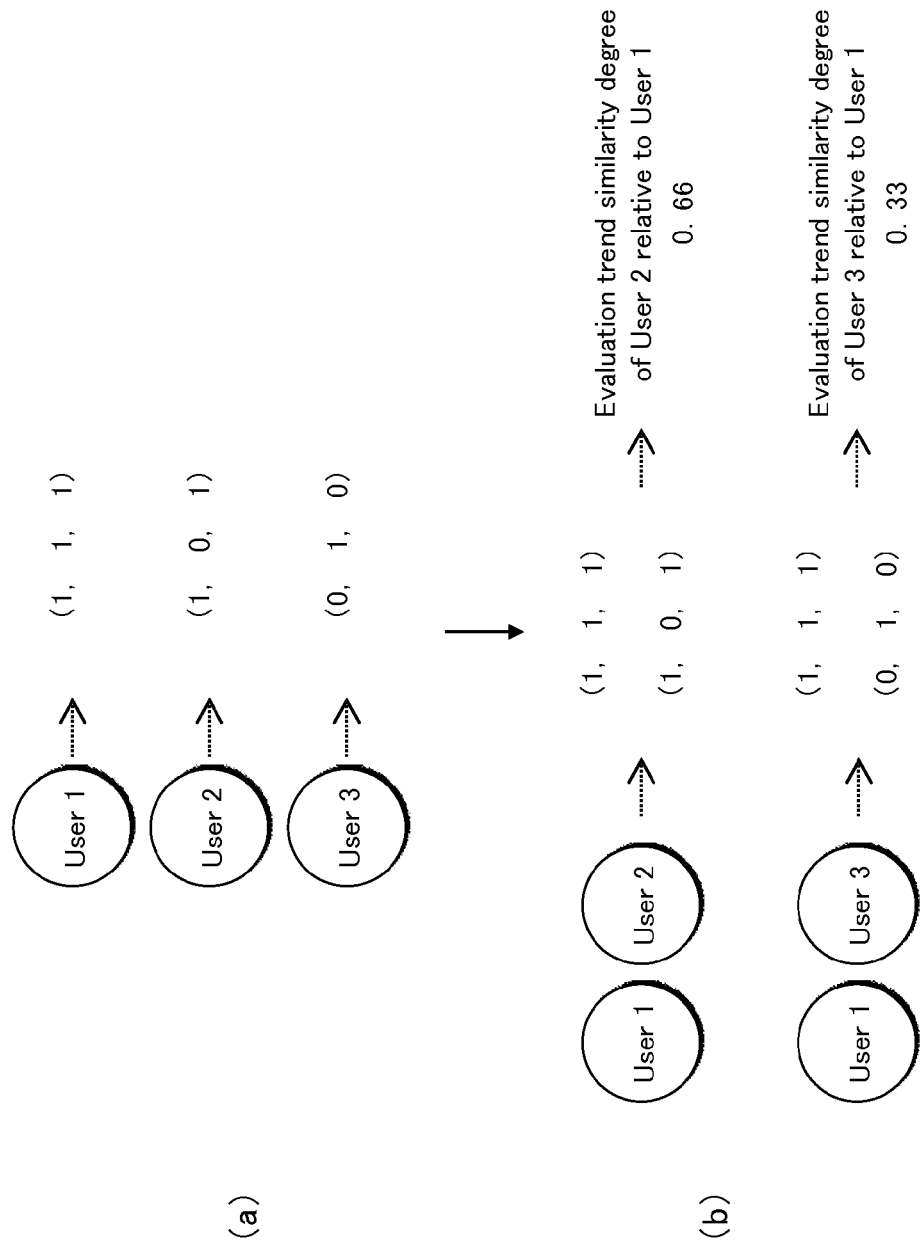
FIG. 13 shows an example of evaluation trend similarity calculation pertaining to Embodiment 1.

Here, detailed description is given to the method for the calculation of the evaluation trend similarity degrees, with reference to a specific example (FIG. 13).

Section (a) of FIG. 13 shows the evaluation features of the users 1 through 3 each evaluating the images 1 through 3. In the specific example (FIG. 13), each of the image 1 through 3 is rated at "1" (i.e. evaluation has been conducted) or "0" (i.e. evaluation has not been conducted) by the users 1 through 3. Therefore, the degree of the evaluation trend similarity between users who have evaluated the same image is high.

For example, since the user 1 and the user 2 have evaluated two of the three images in common, the evaluation trend similarity degree of the user 2 relative to the user 1 (Section (b) of FIG. 13) is $2/3=0.66$ according to [Math. 1] shown below.

Similarly, since the user 1 and the user 3 have evaluated one of the three images in common, the evaluation trend similarity degree of the user 3 relative to the user 1 (Section (b) of FIG. 13) is $1/3=0.33$ according to [Math. 1] shown below.

[Math. 1] shown below is an expression for calculating the evaluation trend similarity degrees. In [Math. 1], vectors D and E denote the evaluation features, and V denotes the evaluation value of an image.

$$\vec{D} = (V_{D1}, V_{D2}, V_{D3}, \ldots, V_{Dm})$$
$$\vec{E} = (V_{E1}, V_{E2}, V_{E3}, \ldots, V_{En})$$
$$evalsimilarity(\vec{D}, \vec{E}) = \cos\theta = \frac{\vec{D} \cdot \vec{E}}{|\vec{D}||\vec{E}|}$$

[Math. 1]

Figure 14:
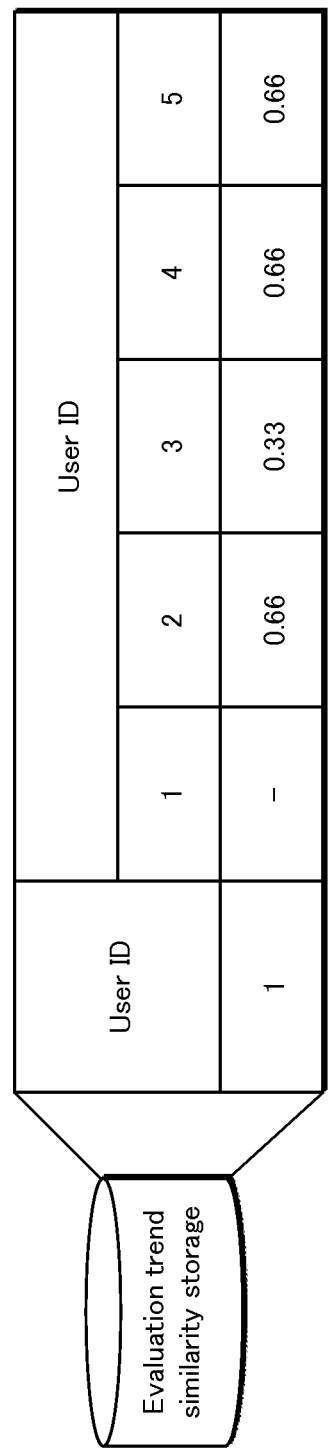
FIG. 14 shows the structure of evaluation trend similarity data pertaining to Embodiment 1.

The structure of the data stored in the evaluation trend similarity storage 75 is shown in FIG. 14. As shown in FIG. 14, the data stored in the evaluation trend similarity storage 75 contains user IDs and evaluation trend similarity degrees.

Figure 15:
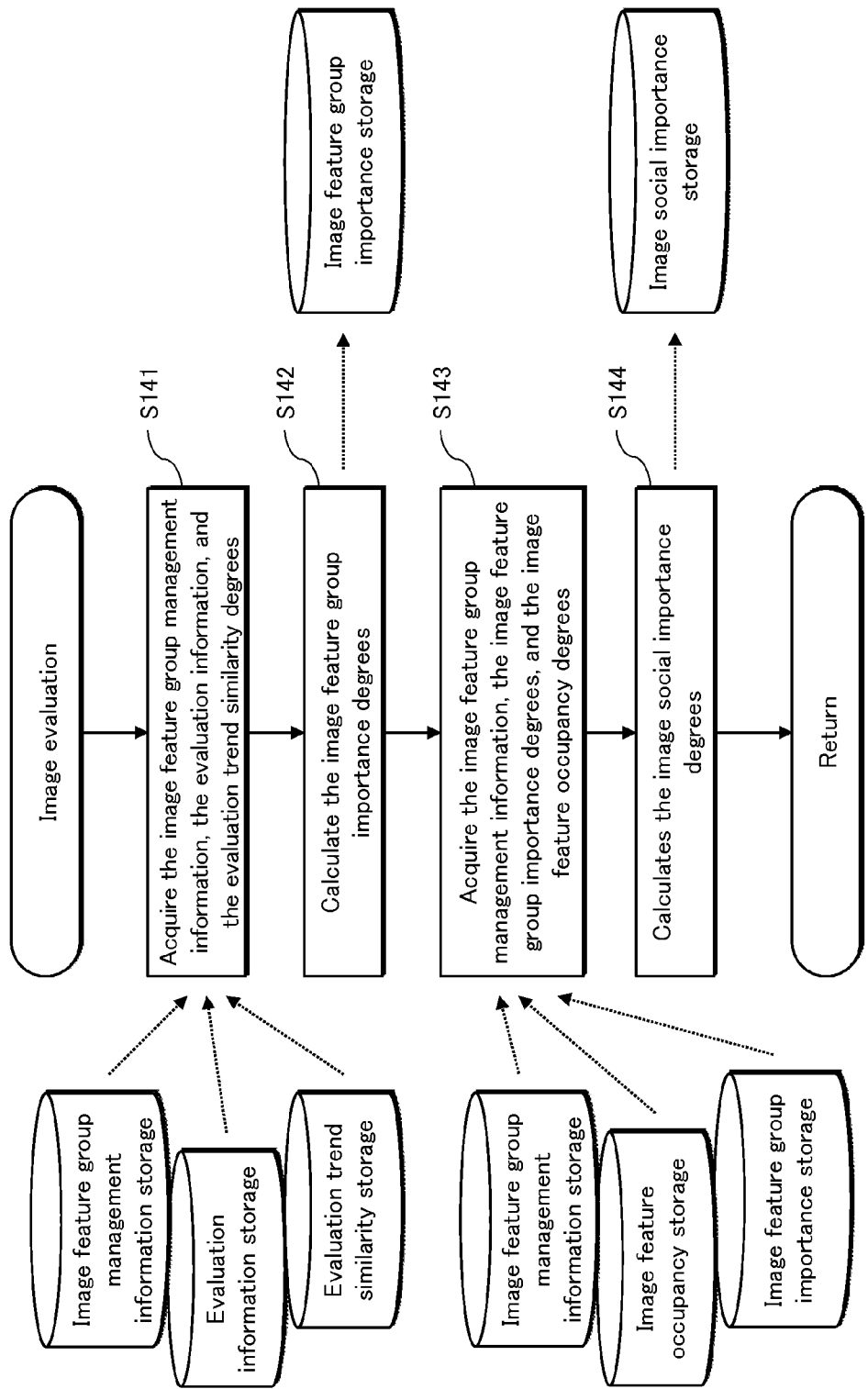
FIG. 15 is a flowchart of image evaluation pertaining to Embodiment 1.

The following describes Step S24 (image evaluation) of FIG. 2 with reference to FIG. 15.

The image feature group importance calculator 61 acquires the image feature group management information from the image feature group management information storage 72, the evaluation information from the evaluation information storage 73, and the evaluation trend similarity degrees from the evaluation trend similarity storage 75 (S141).

Subsequently, the image feature group importance calculator 61 calculates the image feature group importance degree of each image feature group based on the image feature group management information, the evaluation information and the evaluation trend similarity degrees thus acquired, and stores the image feature group importance degrees thus calculated into the image feature group importance storage 76 (S142).

Subsequently, the image social importance calculator 62 acquires the image feature group management information from the image feature group management information storage 72, the image feature group importance degrees from the image feature group importance storage 76, and the image feature occupancy degrees from the image feature occupancy storage 71 (S143).

Subsequently, the image social importance calculator 62 calculates the image social importance degree of each image based on the image feature group management information, the image feature group importance degrees and the image feature occupancy degrees thus acquired, and stores the image social importance degrees thus calculated into the image social importance storage 77 (S144).

Figure 16:
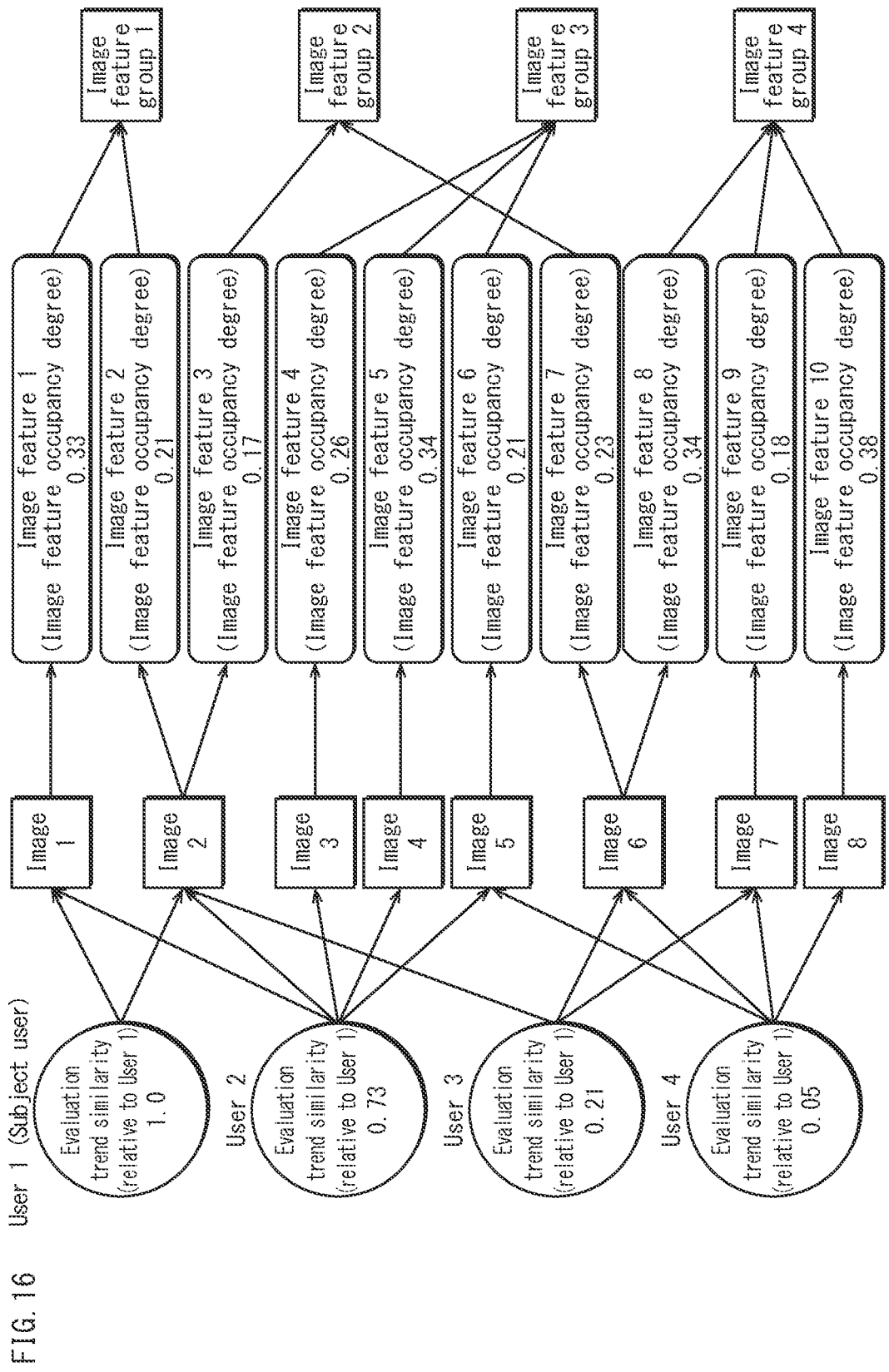
FIG. 16 shows image feature group management information, evaluation information and evaluation trend similarity degrees used for an example of image feature group importance calculation and image social importance calculation.
Figure 17:
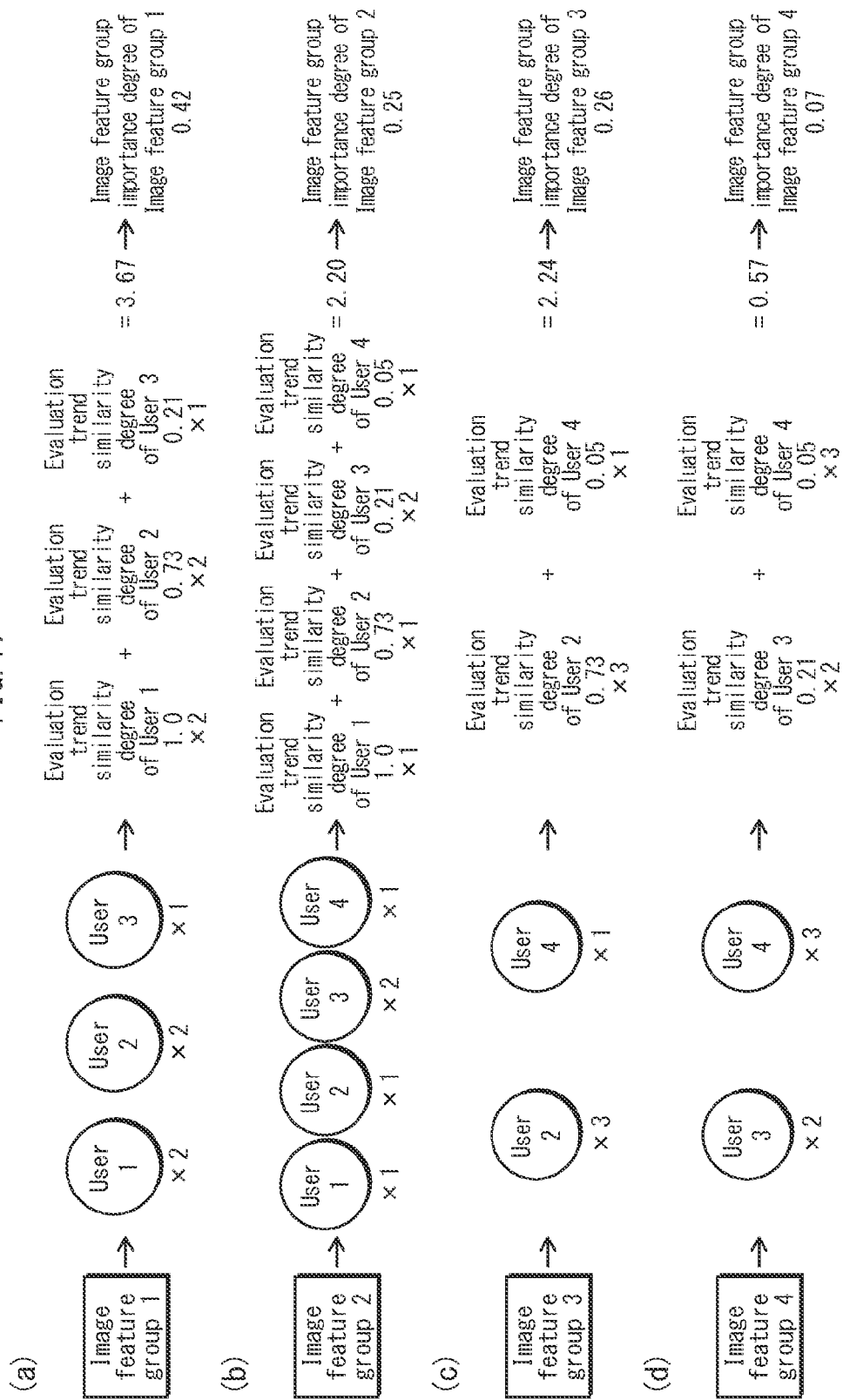
FIG. 17 shows an example of image feature group importance calculation pertaining to Embodiment 1.

Here, detailed description is given to the method for the calculation of the image feature group importance degrees (S142), with reference to a specific example case (FIG. 16, FIG. 17). For the sake of clearly explaining the effect of the present embodiment, a new specific example (FIG. 16: the image feature group management information, the evaluation information, the evaluation trend similarity degrees) is introduced here.

As shown in FIG. 16, it is assumed that the user 1 is the subject user, and that four users, namely the users 1 through 4, have evaluated eight images, namely the images 1 through 8. The images 1 through 8 contain the image features 1 through 10, and the image features 1 through 10 are clustered into the image feature groups 1 through 4. FIG. 16 shows the image feature occupancy degrees, which are the occupancy ratios of the objects from which the image features 1 through 10 are to be extracted, relative to the respective areas containing the objects, and the evaluation trend similarity degrees of the user 1 relative to each user.

For example, suppose the case of calculating the image feature group importance degree of the image feature group 1 (Section (a) of FIG. 17). As image containing the image feature group 1, two images (i.e. the images 1 and 2) have been evaluated by the user 1 (having the evaluation trend similarity degree at 1.0 relative to the user 1), two images (i.e. the images 1 and 2) have been evaluated by the user 2 (having the evaluation trend similarity degree at 0.73 relative to the user 1), and one image (i.e. the images 2) has been evaluated by the user 3 (having the evaluation trend similarity degree at 0.21 relative to the user 1). Therefore, the calculation performed by the image feature group importance calculator 61 according to [Math. 2] shown below is: 1.0×2+0.73×2+0.21×1=3.67. Subsequently, the image feature group importance calculator 61 normalizes the value obtained by the calculation, and obtains 0.42 as the value of the image feature group importance degree of the image feature group 1.

[Math. 2] shown below is an expression for calculating the image feature group importance degrees. In [Math. 2], imgfeatureScore denotes the image feature group importance degree, evalsimilarity denotes the evaluation trend similarity degree, evalcount denotes the number of the evaluations performed on the image feature group by the subject user, P denotes the image feature group (j is a variable corresponding to the range of the number of the image feature groups) and U denotes the users (i is a variable corresponding to the range of the number of the users, and x corresponds to the subject user).

$$imgfeatureScore(P_j) = \sum_i evalsimilarity(U_x, U_i) \times evalcount(P_j, U_i)$$
[Math. 2]

In order to make it easy to compare the importance degrees of the image feature groups, the image feature group importance calculator 61 normalizes the value obtained by the calculation of [Math. 2] to obtain the image feature group importance degrees. The normalization discussed in the present embodiment refers to calculation for adjusting the total to 1.

For example, as shown in FIG. 17 (Sections (a) through (d)), the image feature group importance degrees of the image feature groups 2 through 4 are obtained in the same manner as the image feature group 1 by using [Math. 1], and the result of the calculation with respect to the image feature group 2 is 2.20, the result of the calculation with respect to the image feature group 2 is 2.24, and the result of the calculation with respect to the image feature group 4 is 0.57. Using these values, the value 3.67 obtained for the image feature group 1 by [Math. 2] is normalized by: 3.67/(3.67+2.20+2.24+0.57) =0.42.

The image feature group importance degrees of the image feature groups 2 through 4 are calculated in the same manner as the image feature group importance degree of the image feature group 1 (FIG. 17 (Sections (b) through (d))).

As shown in FIG. 17, the relationship between the image feature groups 1 through 4 in terms of the magnitudes of their respective image feature group importance degrees is represented as: the image feature group 1 (the image feature group degree: 0.42)>the image feature group 3 (the image feature group degree: 0.26)>the image feature group 2 (the image feature group degree: 0.25)>the image feature group 4 (the image feature group degree: 0.07). The image feature group importance degrees of the image feature groups 1 and 2 are high, because the user 1, who is the subject user, has evaluated the images containing image features belonging to the image feature groups 1 and 2. The image feature group importance degree of the image feature group 3 is also high, because the user 2, whose evaluation results have a similar trend to those of the subject user 1, has evaluated many images containing image features belonging to the image feature group 3, even though the subject user 1 has not evaluated any image containing image features belonging to the image feature group 3. The image feature group importance degree of the image feature group 4 is low, because the subject user 1 has not evaluated any image containing image features belonging to the image feature group 4 and only the users 3 and 4, whose evaluation results are not similar to the subject user 1, have evaluated images containing image features belonging to the image feature group 4. In terms of the frequency of image evaluations performed by the users as a whole (i.e. the number of images evaluated by the users), the number of images containing any of the image features belonging to the image feature group 1 is five, the number of images containing any of the image features belonging to the image feature group 2 is five, the number of images containing any of the image features belonging to the image feature group 3 is four, and the number of images containing any of the image features belonging to the image feature group 4 is five. Although the number of the evaluated images related to the image feature group 3 is smaller than the number of the evaluated images related to the image feature group 4, the image feature group 3 has a higher image feature group importance degree than the image feature group 4.

In this way, according to Embodiment 1, the image feature group importance degrees dominantly reflect the results of the evaluation by the subject user and the link users whose evaluation results have a similar trend to those of the subject user, rather than the frequency of the image evaluations by the users as a whole.

Figure 19:
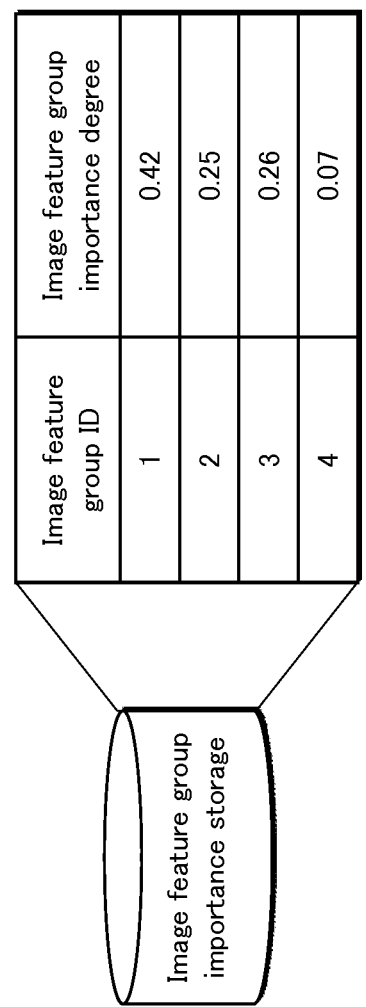
FIG. 19 shows the structure of image feature group importance data pertaining to Embodiment 1.

The structure of the data stored in the image feature group importance storage 76 is shown in FIG. 19. As shown in FIG. 19, the data stored in the image feature group importance degree storage 76 contains "image feature group IDs" and "image feature group importance degrees".

Figure 18:
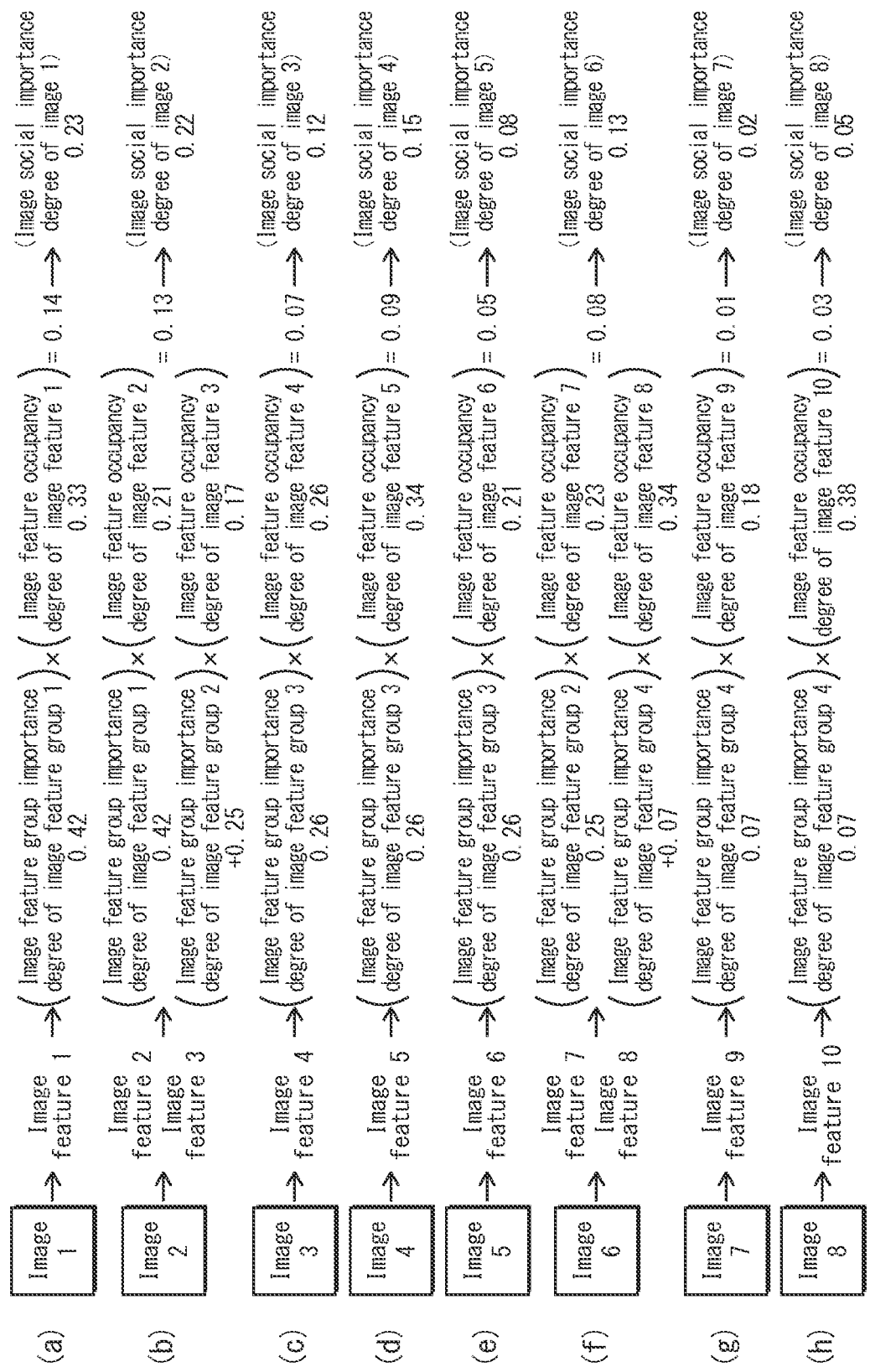
FIG. 18 shows an example of image social importance calculation pertaining to Embodiment 1.

Detailed description is given to the method for the calculation of the image social importance degrees (S144), with reference to a specific example case (FIG. 18, FIG. 16, FIG. 17). As with the description of the image feature group importance degree calculation method (S142), the specific example shown in FIG. 16 (the image feature group management information, the evaluation information, the evaluation trend similarity degrees) are adopted, and the image feature group importance degrees (FIG. 17) calculated based on FIG. 16 are used.

For example, suppose the case of calculating the image social importance degree of the image 1 (Section (a) of FIG. 18). Since the image 1 includes the image feature 1 (with the image feature occupancy degree of 0.33) belonging to the image feature group 1 (with the image feature group importance degree of 0.42), the image social importance calculator 62 performs 0.42×0.33=0.14 according to [Math. 3] shown below. Subsequently, the image social importance calculator 62 normalizes the value obtained by this calculation, and obtains 0.42 as the image social importance degree of the image 1.

In the case of calculating the image social importance degree of the image 2 (Section (b) of FIG. 18), since the image 2 includes two image features, namely the image feature 2 (with the image feature occupancy degree of 0.21) belonging to the image feature group 1 (with the image feature group importance degree of 0.42) and the image feature 3 (with the image feature occupancy degree of 0.17) belonging to the image feature group 2 (with the image feature group importance degree of 0.25), the image social importance calculator 62 performs (0.42×0.21)+(0.25×0.17)=0.13 according to [Math. 3] shown below. Subsequently, the image social importance calculator 62 normalizes the value obtained by this calculation, and obtains 0.22 as the image social importance degree of the image 2.

[Math. 3] shown below is an expression for calculating the image social importance degrees. In [Math. 3], imgSocialScore denotes the image social importance degree, imgfeatureScore denotes the image feature group importance degree, imgfeatureOccupation denotes the image feature occupancy degree, Q denotes the image ID (k is a variable corresponding to the range of the number of the images), S denotes the image feature ID (j is a variable corresponding to the number of image features included in the image Q), and P denotes the image feature group.

$$imgSocialScore(Q_k) = \sum_j imgfeatureScore(P(S_j)) \times imgfeatureOccupation(S_j)$$

Math. 3]

In order to make it easy to compare the importance degrees of the images, the image social importance calculator 62 performs normalization in the calculation of the image social importance degrees (S144) as in the calculation of the image feature group importance degrees (S142).

In addition, as shown in FIG. 18, the image social importance degrees of the image feature groups 3 through 8 are calculated in the same manner as the image social importance degrees of the images 1 and 2. The relationship between the images 1 through 8 in terms of the magnitudes of their respective image social importance degrees is represented as: the image 1>the image 2>the image 4>the image 6>the image 3>the image 5>the image 8>the image 7.

In this way, according to Embodiment 1, the image feature group importance degrees dominantly reflect the results of the evaluation by the subject user and the link users whose evaluation results have a similar trend to those of the subject user, rather than the frequency of the image evaluations by the users as a whole.

Also, since the image social importance degrees are calculated based on the image feature group importance degrees, the image social importance degrees dominantly reflect the results of the evaluation by the subject user and the link users whose evaluation results have a similar trend to those of the subject user, rather than the frequency of the image evaluations by the users as a whole, in the same manner as the image feature group importance degrees.

It can be considered that the importance of an image to the user increases according to the increase of the occupancy ratio of the object from which the image feature is to be extracted, relative to the area containing the object (i.e. an image whose area is largely occupied by the object to be extracted can be assumed to be important to the user). According to Embodiment 1, the image social importance degree is obtained by multiplying the image feature group importance degree by the image feature occupancy degree. Therefore, the image social importance degree of an image increases according to the increase of the area occupied by the object from which the image feature is to be extracted. By additionally performing the multiplication with the image feature occupancy degree, the image social importance calculator 62 can obtain more accurate image social importance degrees compared to the case of using only the image feature group importance degrees.

Figure 20:
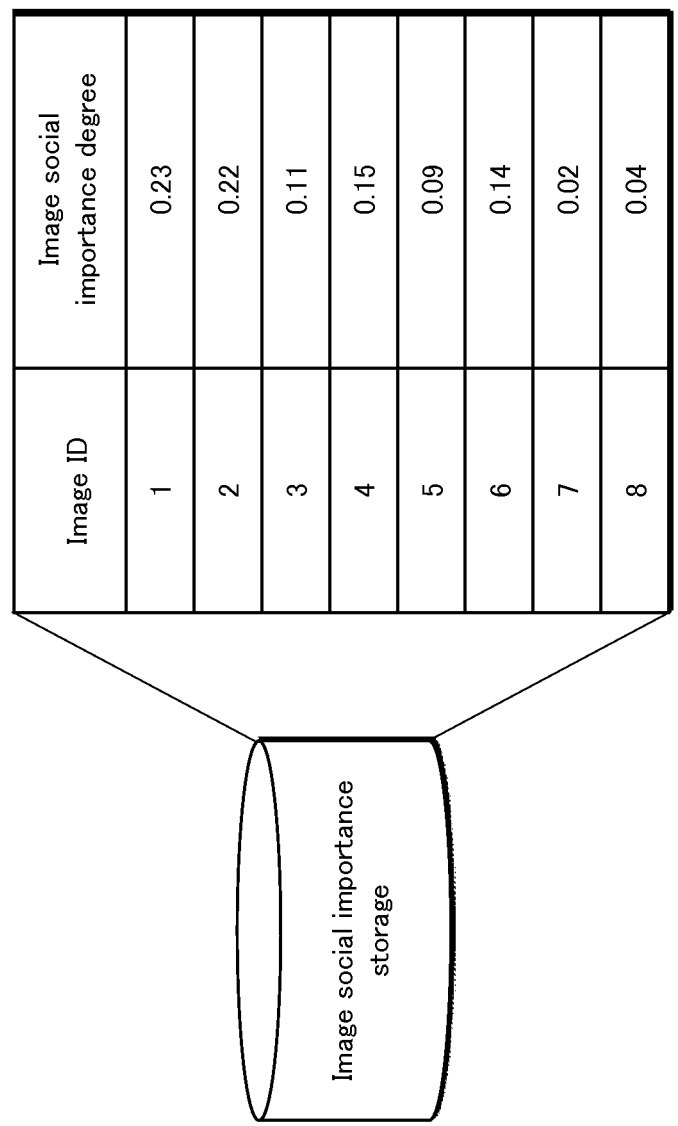
FIG. 20 shows the structure of image social importance data pertaining to Embodiment 1.

The structure of the data stored in the image social importance storage 77 is shown in FIG. 20. As shown in FIG. 20, the data stored in the image social importance storage 77 contains "image IDs" and "image social importance degrees".

<1-3 Summary>

According to the image evaluation pertaining to Embodiment 1, an image feature group composed of image features contained in images that have been evaluated by the subject user or the link users whose evaluation results have a similar trend to those of the subject user is regarded as an important image feature group for the subject user. Accordingly, images containing any image feature belonging to such an image feature group are regarded as important images. Thus, according to the image evaluation pertaining to Embodiment 1, images that are important to the subject user will be rated high.

Figure 21:
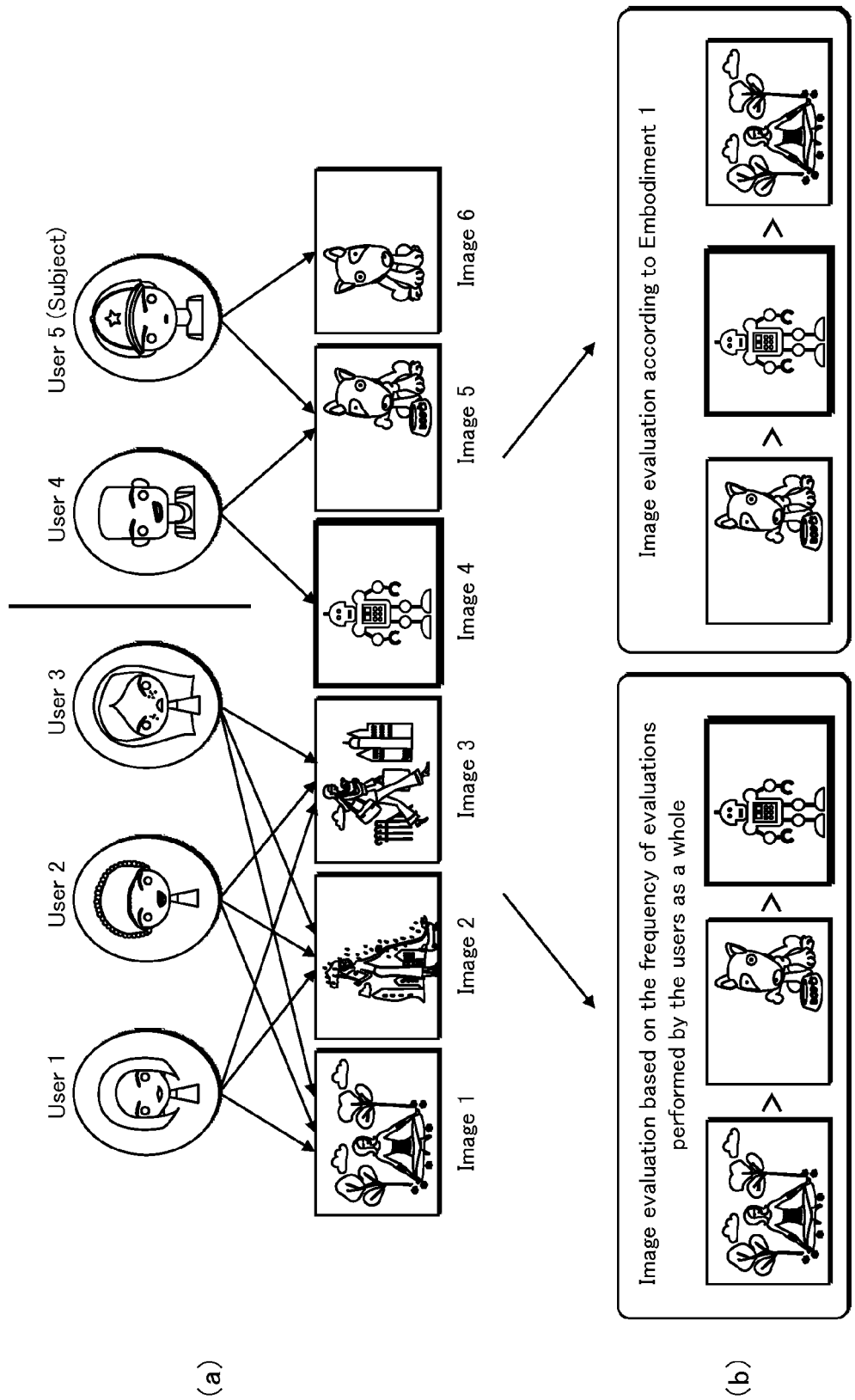
FIG. 21 shows an example of image ranking pertaining to Embodiment 1.

The specific example shown in FIG. 21 compares the image evaluation pertaining to Embodiment 1 with conventional image evaluation based on the frequency of evaluations performed by the users as a whole. As shown in Section (a) of FIG. 21, suppose the case where the users 1 through 5 have evaluated the images 1 through 6. Also assume that the subject user is the user 5 and the link user whose evaluation results have a similar trend to those of the subject user is user 4. For the sake of simplification of the explanation of the effects of the image evaluation pertaining to Embodiment 1, the following discusses the rating of three images, the images 1, 4 and 5.

First, according to the conventional image evaluation based on the frequency of the evaluations by all the users, the ratings of the three images will be: Image 1>Image 5>Image 4 (Left part of Section (b) of FIG. 21). In this way, according to the conventional image evaluation based on the frequency of the evaluations by all the users, the image 1 will be rated at the highest because the image 1 has been most frequently evaluated by users. On the other hand, the images 4 evaluated by the subject user 5 and the image 4 evaluated by the user 4 whose evaluation results have a similar trend to those of the subject user 5, will not be rated high.

In contrast, according to the image evaluation pertaining to Embodiment 1, the ratings of the three images will be: Image 5>Image 4>image 1 (Right part of Section (b) of FIG. 21). In this way, according to the image evaluation pertaining to Embodiment 1, the image 5 evaluated by the subject user 5 and the image 4 evaluated by the user 4 whose evaluation results have a similar trend to those of the subject user 5, are rated high. These results also show that the image evaluation according to Embodiment 1 gives high ratings to images that are important to an individual user.

2. Embodiment 2

Similar to Embodiment 1, Embodiment 2 relates to an image evaluation device that treats images on a social network, and that evaluates the images for each individual user.

According to the description above, the image evaluation device 3A pertaining to Embodiment 1 calculates the degrees of the evaluation trend similarity between the subject user and the link users, calculates the degrees of the importance of image features based on the evaluation trend similarity degrees, and evaluates the images for the subject user based on the importance degrees of the image features. In contrast, an image evaluation device pertaining to Embodiment 2 is different from Embodiment 1 in that the image evaluation device pertaining to Embodiment 2 utilizes graph analysis and evaluates image for the subject user based on co-appearance of communities, co-appearance of users, co-appearance of images, and co-appearance of image features.

The following describes an image evaluation device pertaining to Embodiment 2 with reference to the drawings. In the following description of the image evaluation device pertaining to Embodiment 2, the same components as the image evaluation device 3A pertaining to Embodiment 1 are assigned the same reference numbers, and their explanation is omitted.

<2-1. Structure>

Figure 22:
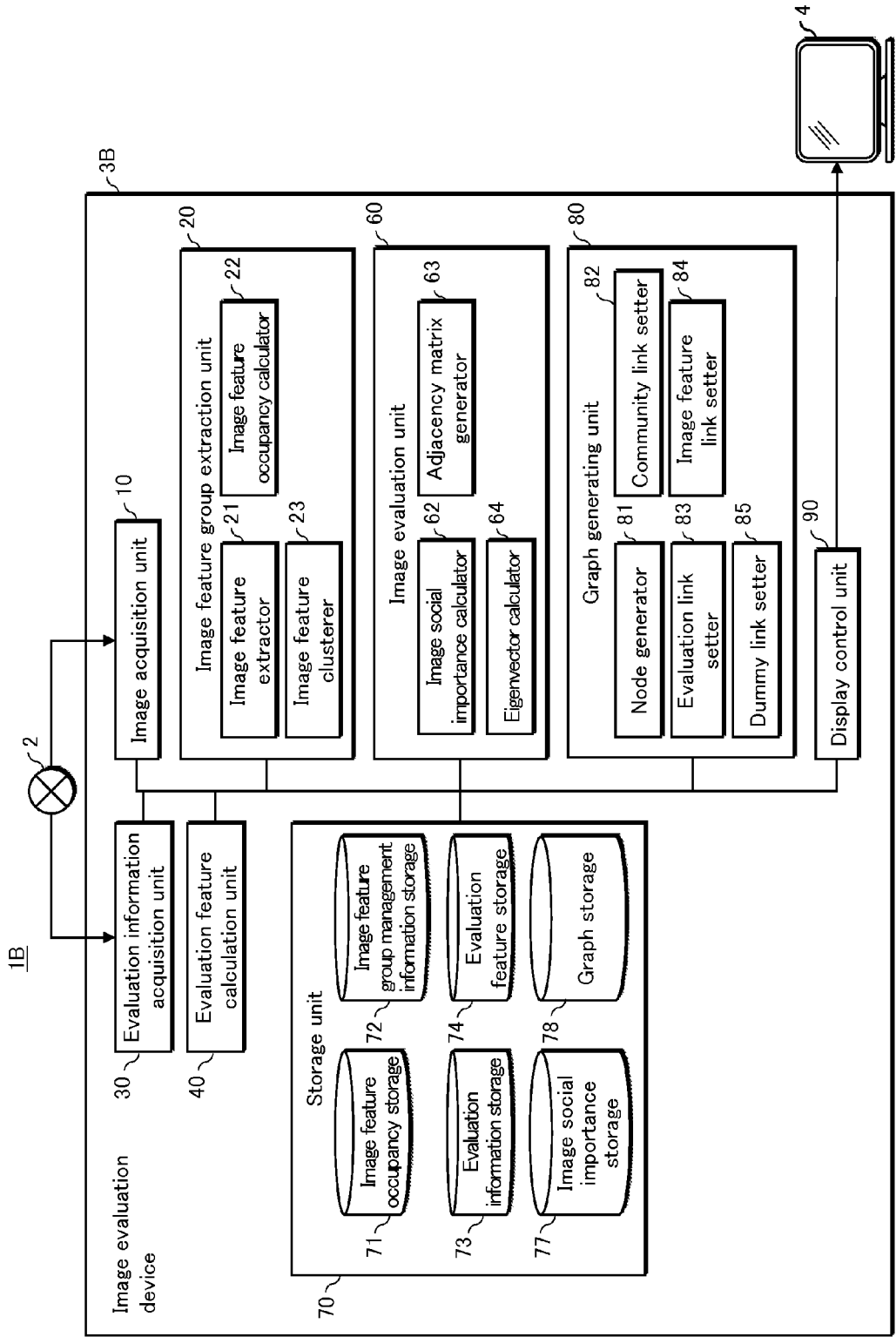
FIG. 22 is a block diagram of an image evaluation system pertaining to Embodiment 2.

FIG. 22 is a block diagram of an image evaluation system 1B pertaining to Embodiment 2.

As shown in FIG. 22, an image evaluation device 3B pertaining to Embodiment 2 includes a graph generating unit 80 in addition to the components of the image evaluation device 3A pertaining to Embodiment 1 (FIG. 1). Furthermore, the image evaluation unit 60 of Embodiment 2 includes an adjacency matrix generator 63 and an eigenvector calculator 64 in addition to the components of the image evaluation unit 60 of Embodiment 1. Furthermore, the storage unit 70 of Embodiment 2 includes a graph storage 78 in addition to the components of the storage unit 70 of Embodiment 1.

Although the image evaluation device 3A pertaining to Embodiment 1 calculates the degrees of the evaluation trend similarity between the subject user and the link users in order to evaluate images, it is unnecessary for the image evaluation device 3B pertaining to Embodiment 2 to calculate the evaluation trend similarity degrees because the image evaluation device 3B sets evaluation links based on the relationship between the users and the ratings of the images and performs the image evaluations by graph analysis. For this reason, the evaluation trend similarity calculation unit 50 and the evaluation trend similarity storage 75 included in the image evaluation device 3A pertaining to Embodiment 1 (FIG. 1) are removed from the image evaluation device 3B pertaining to the present embodiment.

In addition, although the image evaluation device 3A pertaining to Embodiment 1 calculates the image social importance degrees based on the image feature group importance degrees, it is unnecessary for the image evaluation device 3B pertaining to Embodiment 2 to calculate the image feature group importance degrees because the image evaluation device 3B sets image feature links based on the dependency between the images and the image features and calculates the image social importance degrees by graph analysis. For this reason, the image feature group importance calculator 61 and the image feature group importance storage 76 included in the image evaluation device 3A pertaining to Embodiment 1 (FIG. 1) are removed from the image evaluation device 3B pertaining to Embodiment 2.

The graph generating unit 80 has functions to generate nodes, to generate a graph showing links between the nodes, and to store the graph thus generated into the graph storage 78. The graph generating unit 80 includes a node generator 81, a community link setter 82, an evaluation link setter 83, an image feature link setter 84, and a dummy link setter 85.

The generated graph is used for calculating the image social importance degrees. The image feature group importance degrees show the relationship between the images, the users and the image feature groups. This graph is a directed graph, in which each of the links between the nodes has a direction.

The node generator 81 acquires the image feature group management information from the image feature group management information storage 72, the evaluation information and the community information from the evaluation information storage 73, and the image feature occupancy degrees from the image feature occupancy storage 71.

The "community information" shows information about the communities that the subject user belongs to, and specifies, from among the communities that the subject user belongs to, the community that each link user sharing images with the subject user belongs to. In other words, the community information shows which community's member each link user is, among the communities that the subject user belongs to.

The node generator 81 further generates nodes corresponding to the communities, the users, and the images and dummy nodes, based on the image feature group management information, the evaluation information, the community information and the image feature occupancy degrees thus acquired. Specifically, the node generator 81 generates image nodes respectively representing the images shared on the account of the subject user, image feature group nodes respectively representing the image feature groups that the image features belong to, user nodes respectively representing the users including the subject user and the link users sharing images with the subject user, community nodes respectively representing the communities that the subject user belongs to, and dummy nodes. That is, the image nodes, the image feature group nodes, the user nodes, and the community nodes respectively represent a group of image elements, a group of image feature group elements, a group of user elements, and a group of community elements.

The dummy nodes are nodes for adjusting the weights of the links between the nodes. For example, the dummy nodes resolve the problem of rank sinks, which is the problem where importance degrees are accumulated by nodes and never distributed due to there being no outward-directed links.

After the community link setter 82, the evaluation link setter 83, the image feature link setter 84 and the dummy link setter 85 set the links, the node generator 81 outputs a graph representing all the links thus set, and stores the graph into the graph storage 78.

The community link setter 82 sets community links, which are links between the community nodes and user nodes generated by the node generator 81. Specifically, the community link setter 82 sets the link value of each community link by performing the eigenvector calculation described below based on the community information acquired by the node generator 81, so that the importance of each user propagates among the user nodes via the community nodes.

The subject user is important, because the subject user is a user for whom the image evaluation pertaining to the present invention is performed and the subject user belongs to all the communities and is related to all the link users. Similarly, the link users belonging to many of the communities are important for the subject user, because such link users are related to many other link users as with the subject user is.

The community link setter 82 sets the link value of each community link by performing the eigenvector calculation described below so that the importance of each user propagates among the user nodes via the community nodes. Therefore, the community link setter 82 can increase the importance degree of the subject user, who belongs to all the community, and the importance degrees of the link users, who are important for the subject user.

The evaluation link setter 83 sets evaluation links, which are links between the user nodes and image nodes generated by the node generator 81. Specifically, the evaluation link setter 83 sets the link value of each evaluation link by performing the eigenvector calculation described below based on the evaluation information acquired by the node generator 81, so that the importance of each image propagates among the image nodes via the user nodes.

Images that have been evaluated by important users (i.e. the subject user and important users for the subject user) are important images. Link users who have evaluated the same images as important users can be regarded as having a similar sense of values to those of the important users, and hence such link users can also be regarded as important users. Therefore, images that have been evaluated by the link users having a similar sense of values to those of the important users can be regarded as important images.

The evaluation link setter 83 sets each evaluation link by performing the eigenvector calculation described below so that the importance of each image propagates among the image nodes. Therefore, the evaluation link setter 83 can increase the importance degrees of images that have been evaluated by users who have a similar sense of values to those of important users (i.e. the subject user and important users for the subject user).

The image feature link setter 84 sets image feature links, which are links between the image nodes and image feature group nodes generated by the node generator 81. Specifically, the image feature link setter 84 sets the link value of each image feature link by performing the eigenvector calculation described below based on the image feature group management information acquired by the node generator 81, so that the importance of each image propagates among the image nodes via the image feature group nodes.

An image feature group composed of image features contained in an important image can be regarded as an important image feature group. An image containing any image feature belonging to an important image feature group can be regarded as an important image. An image containing a larger number of image features belonging to an important image feature group can be regarded as more important.

The image feature link setter 84 sets each image feature link by performing the eigenvector calculation described below so that the importance of each image propagates among the image nodes. Therefore, the image feature link setter 84 can increase the importance degrees of images containing any image feature belonging to any important image feature group during the image evaluation for the subject user.

The dummy link setter 85 sets dummy links, which are links between the community nodes, users nodes, image nodes, and image feature group nodes generated by the node generator 81. Specifically, the dummy link setter 85 sets the link value of each dummy link by performing the eigenvector calculation described below based on the total number of the nodes generated by the node generator 81, so that each quadruple link structure composed of a community link, an evaluation link and an image feature link will be recursive, i.e., so that the importance degree of each element will not be accumulated by nodes.

The adjacency matrix generator 63 acquires a graph from the graph storage 78, and generates an adjacency matrix M from the acquired graph.

The eigenvector calculator 64 calculates an eigenvector from the adjacency matrix M generated by the adjacency matrix generator 63.

The image social importance calculator 62 calculates image social importance degrees of images based on a dominant eigenvector calculated by the eigenvector calculator 64, and stores the image social importance degrees thus calculated into the image social importance storage 77.

The graph storage 78 converts the graph generated and output by the graph generating unit 80 to a table and stores the table.

<2-2. Operations>

The following describes operations of the image evaluation device 3B pertaining to Embodiment 2.

Figure 23:
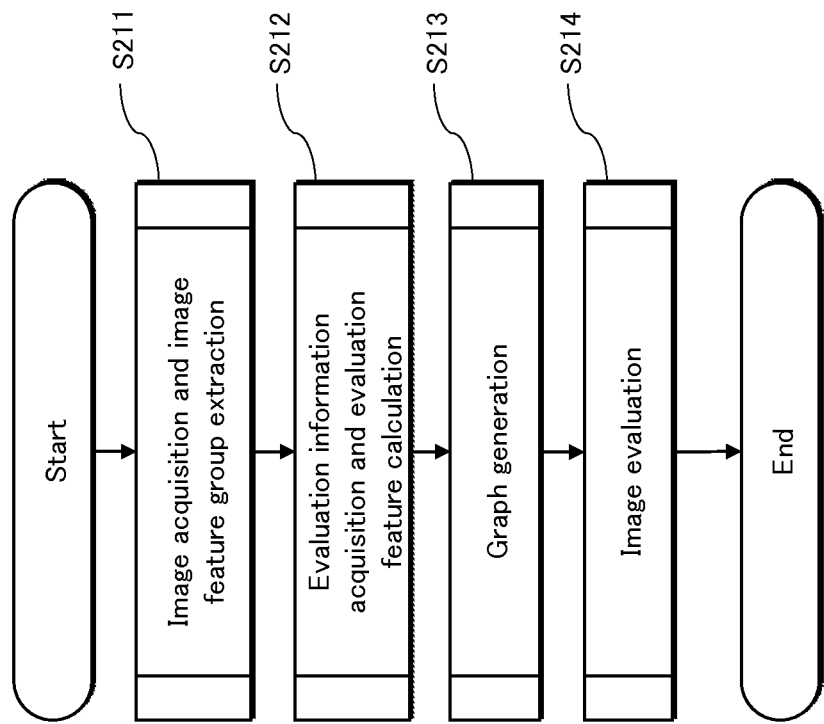
FIG. 23 shows an entire flowchart pertaining to Embodiment 2.

FIG. 23 is a flowchart showing image evaluation processing performed by the image evaluation device 3A shown in FIG. 22. The image evaluation device 3B shown in FIG. 22 sequentially performs image acquisition and image feature group extraction (S211), evaluation information acquisition and evaluation feature calculation (S212), graph generation (S213) and image evaluation (S214). Steps S211 and S212 are the same as Steps S21 and S22 pertaining to Embodiment 1 (FIG. 2), and their explanation is omitted.

Figure 24:
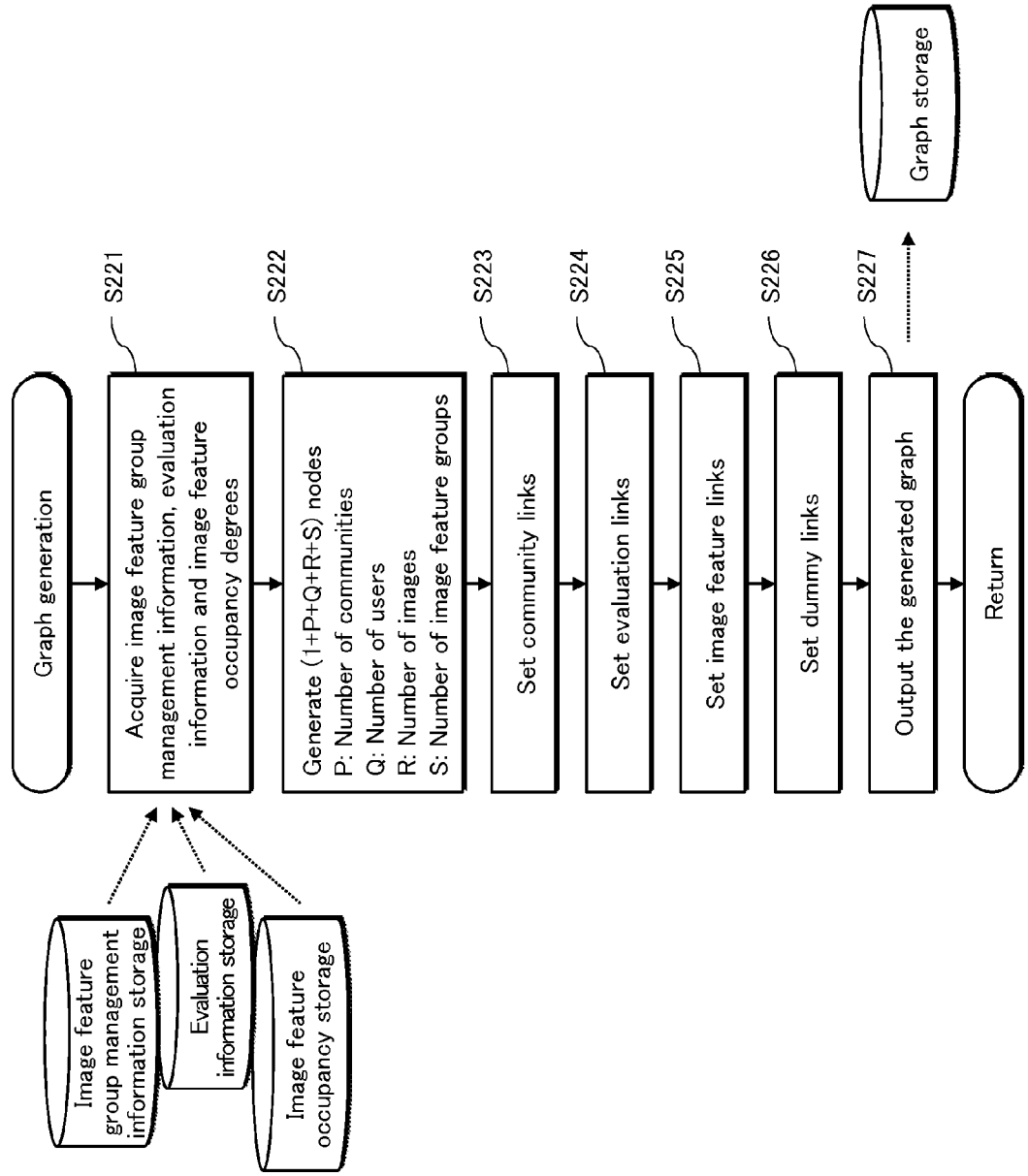
FIG. 24 shows a flowchart of graph generation pertaining to Embodiment 2.

Step S213 (graph generation) shown in FIG. 21 is described below with reference to FIG. 24 and a specific example case (The link values are set as shown in FIG. 25 through 28).

The node generator 81 acquires the image feature group management information from the image feature group management information storage 72, the evaluation information and the community information from the evaluation information storage 73, and the image feature occupancy degrees from the image feature occupancy storage 71 (S221). Subsequently, the node generator 81 generates a given number of nodes (S222). Here, the number is obtained by 1+P+Q+R+S, where P denotes the number of the communities, Q denotes the number of the users, R denotes the number of the images, and S denotes the number of the image features.

Subsequently, when a user belongs to a community, the community link setter 82 sets a community link between the community node and the user node (S223).

Figure 25:
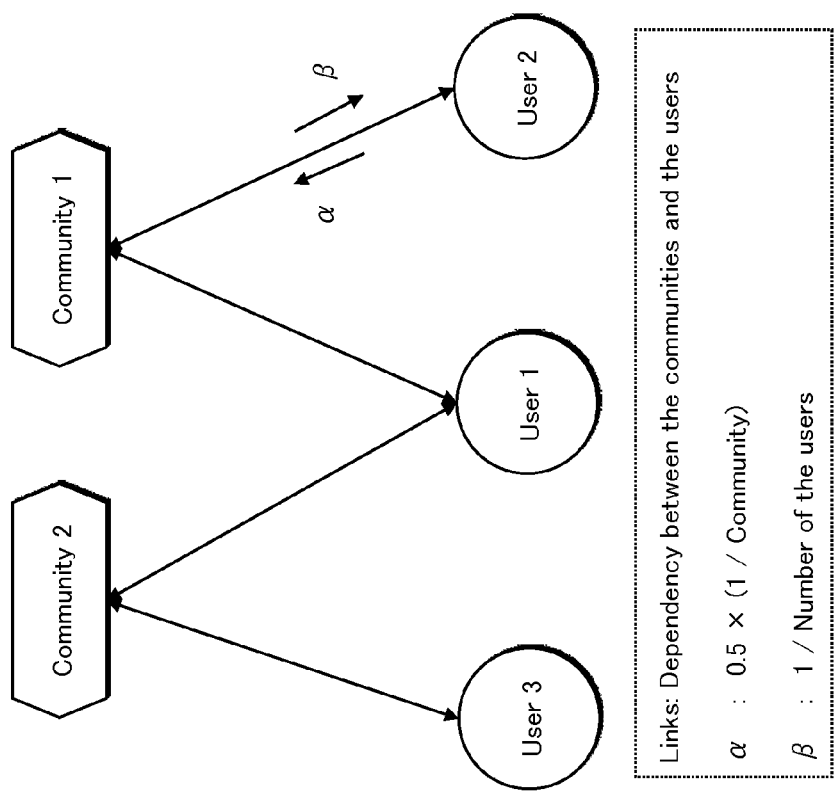
FIG. 25 is an example of community link setting pertaining to Embodiment 2.

For example, FIG. 25 shows the community links in the case where the users 1 and 2 belong to the community 1 and the users 1 and 3 belong to the community 2. As shown in FIG. 25, the community link setter 82 determines the link values by performing the following calculations, for example: α=0.5× (1/(the number of the communities)), where α denotes the link value of a link from a user node to a community node; and β=0.5×(1/(the number of the users)), where β denotes the link value of a link from a community node to a user node.

The evaluation link setter 83 sets an evaluation link between a user node and an image node when the user evaluates the image (S224).

Figure 26:
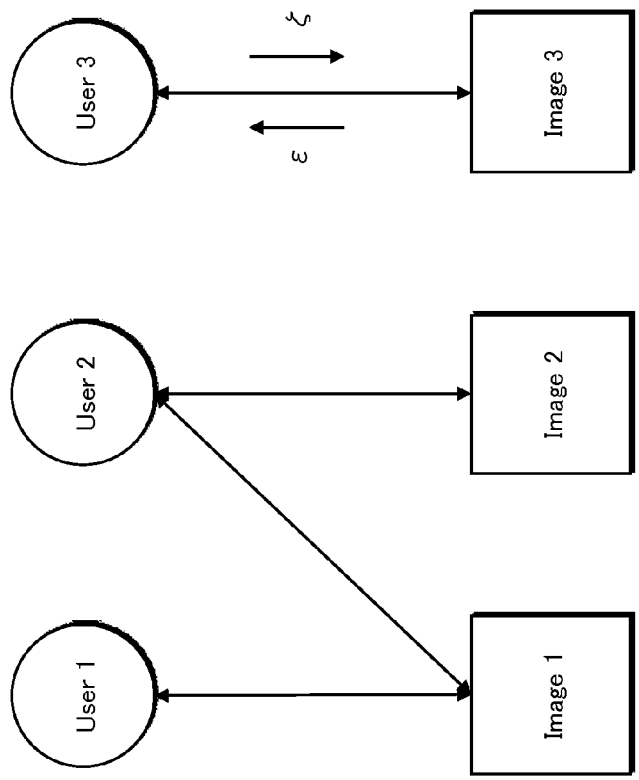
FIG. 26 is an example of evaluation link setting pertaining to Embodiment 2.

For example, FIG. 26 shows the evaluation links in the case where the user 1 has evaluated the image 1, the user 2 has evaluated the images 1 and 2 and the user 3 has evaluated the image 3. As shown FIG. 26, the evaluation link setter 83 determines the link values by performing the following calculations, for example: ζ=0.5×(1/(the number of the images))×(a fixed value), where ζ denotes the link value of a link from a user node to an image node; and ε=0.5×(1/(the number of the users))×(a fixed value), where ε denotes the link value of a link from an image node to a user node.

The image feature link setter 84 sets an image feature link between an image node and an image feature group node when the image contains image features belonging to the image feature group (S225).

Figure 27:
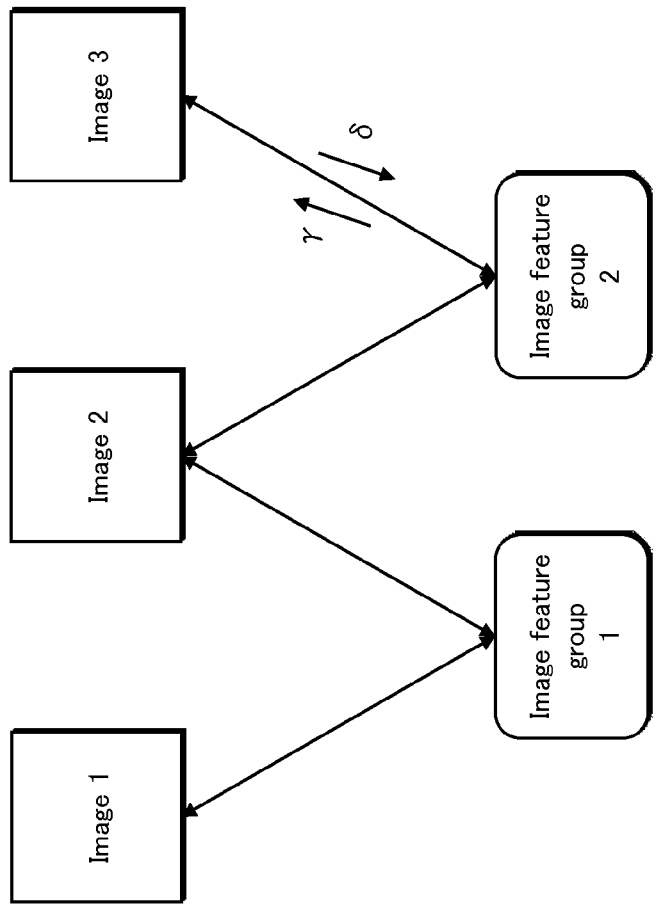
FIG. 27 is an example of image feature link setting pertaining to Embodiment 2.

For example, FIG. 27 shows the image feature links in the case where the image 1 contains image features belonging to the image feature group 1, the image 2 contains image features belonging to the image feature groups 1 and 2, and the image 3 contains image features belonging to the image feature group 2. As shown in FIG. 27, the image feature link setter 84 determines the link values by performing the following calculations, for example: δ=0.5×(1/(the number of the image feature groups))×(the image feature occupancy degree), where δ denotes the link value of a link from an image node to an image feature group node; and γ=1/(the number of the images), where γ denotes the link value of a link from an image feature group node to an image node.

The dummy link setter 85 sets a dummy link between a dummy node and each community, user, image and image feature group node (S226).

Figure 28:
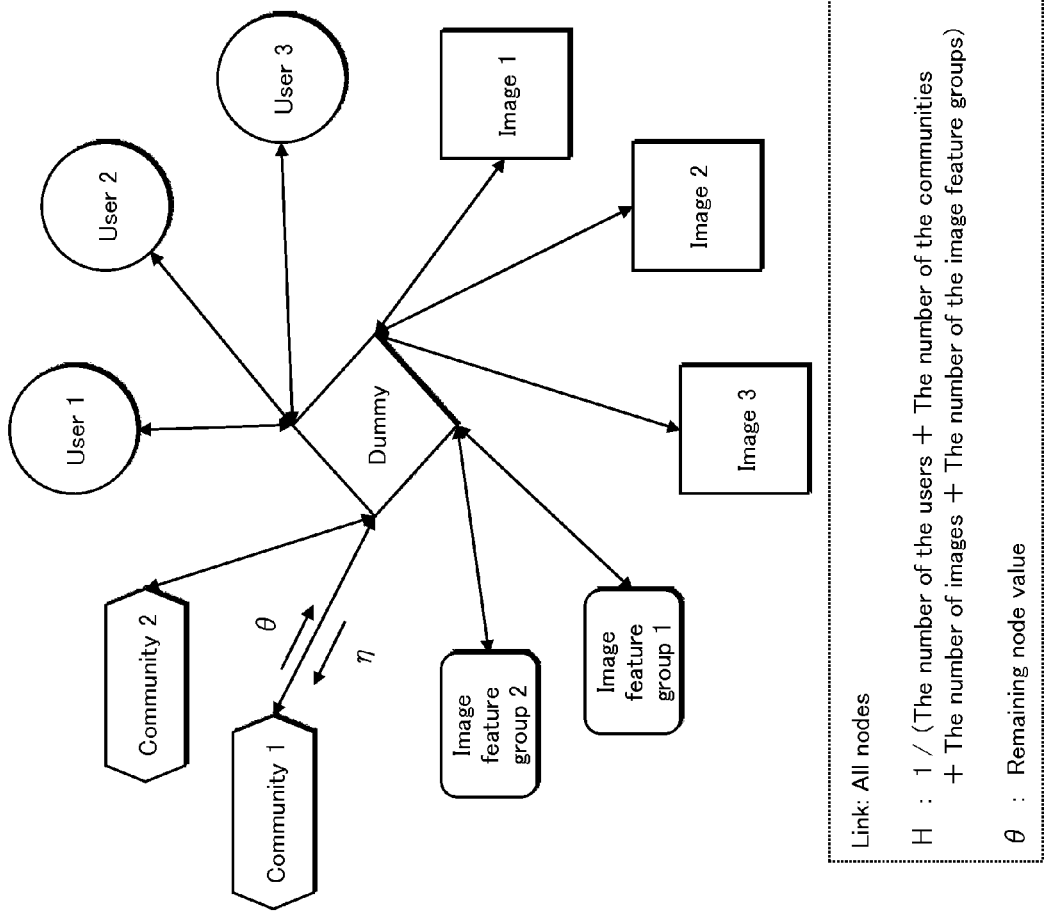
FIG. 28 is an example of dummy link setting pertaining to Embodiment 2.

For example, FIG. 28 shows the dummy links between the dummy node and each of the nodes of the community 1, the community 2, the user 1, the user 2, the user 3, the image 1, the image 2, the image 3, the image feature group 1 and the image feature group 2. As shown in FIG. 28, the dummy link setter 85 determines the link values by performing the following calculations, for example: θ=1−(the total of the link values of all the links of the nodes other than the dummy nodes), where θ denotes the link value of the link from each node to the dummy node; and η=1/((the number of the users)+(the number of the communities)+(the number of image feature groups)), where η denotes the link value of the link from the dummy node to each of the community, user, image, and image feature group nodes.

Finally, the node generator 81 generates a graph representing the community links, the evaluation links, the image feature links and the dummy links which have been set in Step S223 to S226, and outputs the graph thus generated to the graph storage 78 to store the graph in the graph storage 78 (S227).

Specifically, the graph storage 78 converts the graph to a table, and stores the table in Step S227.

Figure 29:
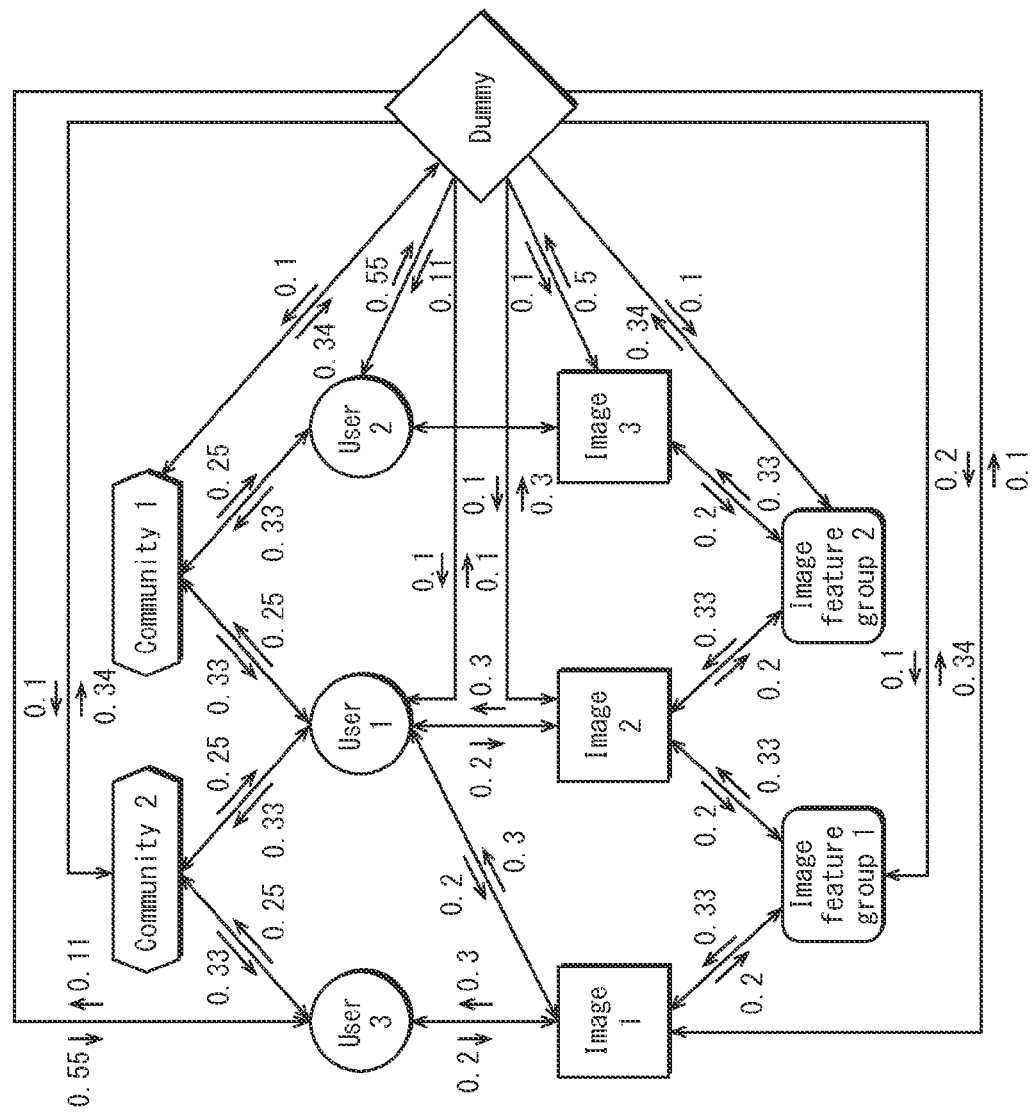
FIG. 29 shows an example graph generated according to Embodiment 2.

FIG. 29 shows a graph generated by setting the community links, the evaluation links, the image feature links and the dummy links (S222 to S226).

Figure 30:
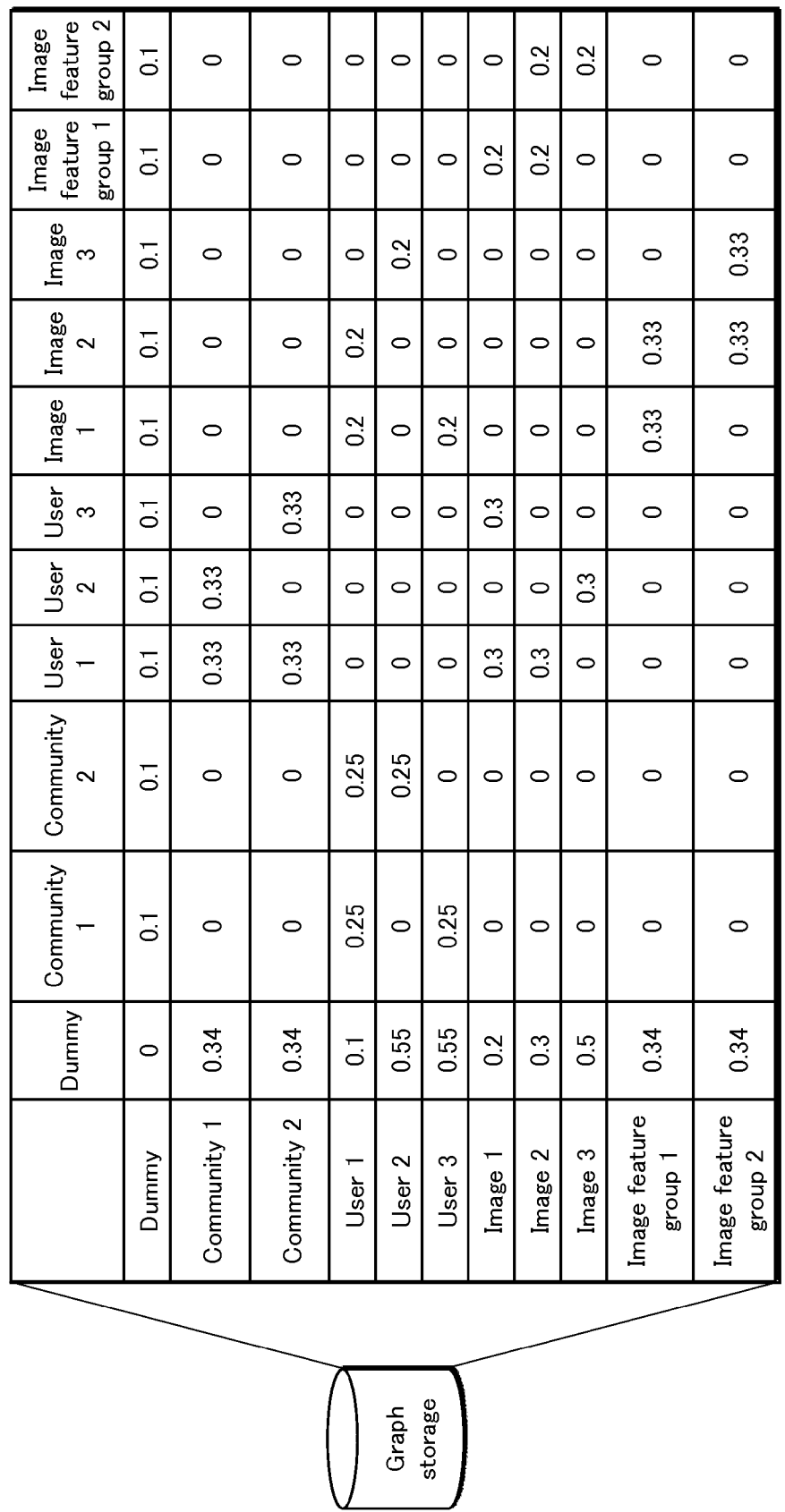
FIG. 30 shows a data structure of graph information pertaining to Embodiment 2.

FIG. 30 shows the structure of the data stored in the graph storage 78, which has been converted to a table from the data shown in FIG. 29. As shown in FIG. 30, the data stored in the graph storage 78 contains values related to communities, users, images, image feature groups and a dummy.

Figure 31:
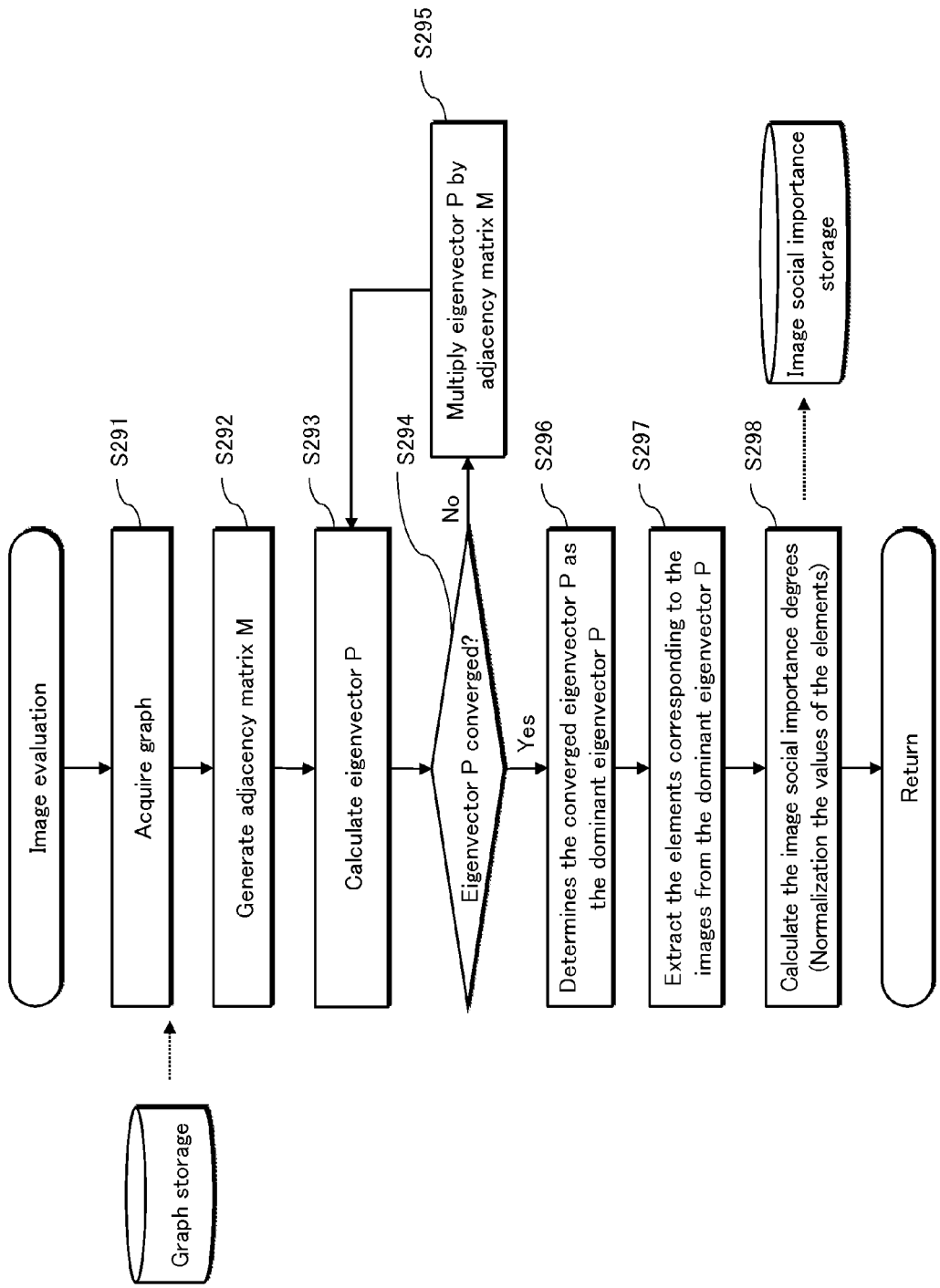
FIG. 31 is a flowchart of image evaluation pertaining to Embodiment 2.

The following describes Step S214 (image evaluation) of FIG. 23 with reference to FIG. 31 and a specific example case (FIG. 30 through FIG. 33).

The adjacency matrix generator 63 acquires the table, which has been converted from the graph, from the graph storage 78 (S291). Subsequently, the adjacency matrix generator 63 generates an adjacency matrix M from the table thus acquired (S292).

For example, suppose the case where the adjacency matrix generator 63 has acquired the table shown in FIG. 30 (S291). In this case, the adjacency matrix generator 63 generates a square adjacency matrix M shown in FIG. 32, from the table thus acquired (S292).

After Step S292, the eigenvector calculator 64 calculates a dominant eigenvector P of the adjacency matrix M generated by the adjacency matrix generator 63 (Steps S293 to S295). Steps S293 to S295 correspond to power iteration, which is a method of simultaneously calculating an eigenvalue and an eigenvector belonging to it.

Specifically, when the eigenvector P calculated in Step S293 has not converged (S294: No), the eigenvector calculator 64 multiplies the eigenvector P by the original adjacency matrix M (S295) and recursively performs the calculation until the eigenvector P converges.

When the eigenvector P converges (S294: Yes), the eigenvector calculator 64 determines the converged eigenvector P as the dominant eigenvector P (S296).

Next, in Step S297, the image social importance calculator 62 extracts the elements corresponding to the images from the dominant eigenvector P calculated by the eigenvector calculator 64. For example, the image social importance calculator 62 extracts 0.78 as the element corresponding to the image 1, 0.171 as the element corresponding to the image 2, and 0.076 as the element corresponding to the image 3 (Section (a) of FIG. 33).

Figure 33:
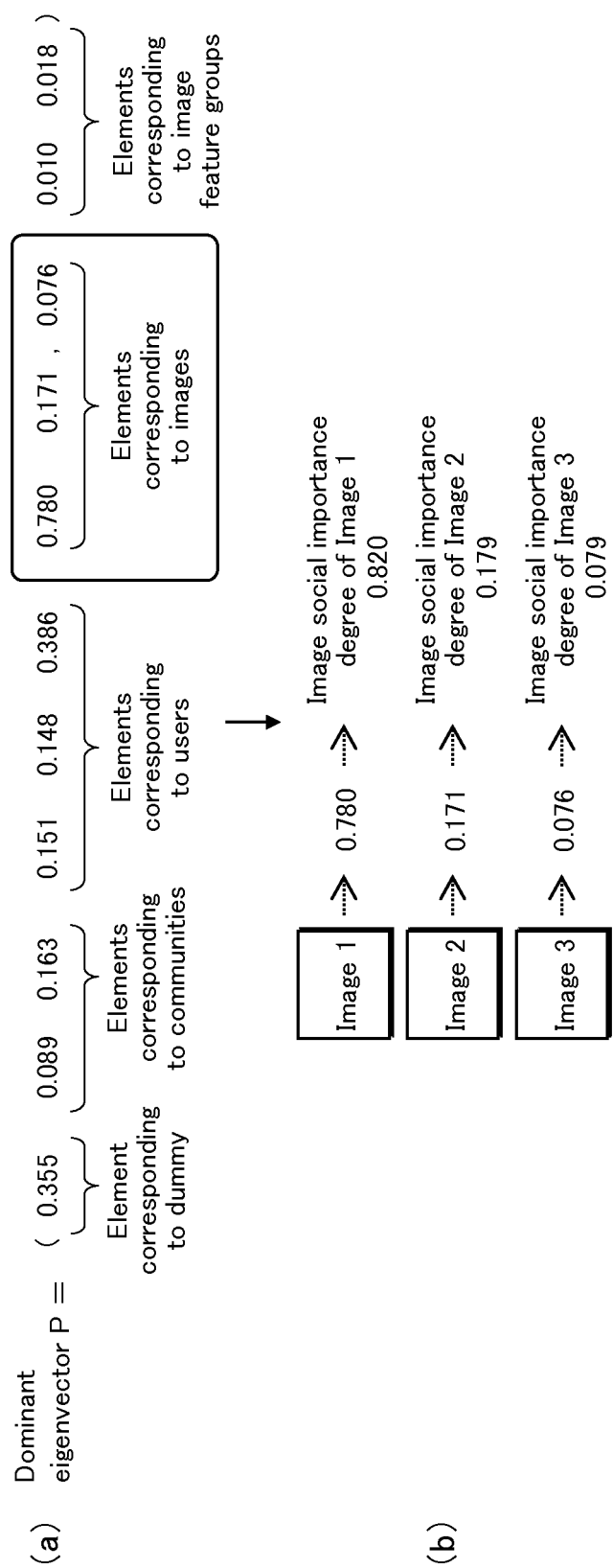
FIG. 33 shows an example of image social importance calculation pertaining to Embodiment 2.

Subsequently, in Step S298, the image social importance calculator 62 calculates the image social importance degrees of the image 1 and the image 2 by normalizing the extracted image elements (Section (b) of FIG. 33), and stores the image social importance degrees thus calculated into the image social importance storage 77.

The method discussed in Non-Patent Literature 3 may be used for generating the adjacency matrix M and calculating the dominant eigenvector.

<2-3 Summary>

The image evaluation device 3B pertaining to Embodiment 2 analyzes a graph representing the relationship between the following elements: image shared on the account of the subject user within a social network; clusters of image features contained in the images; users including the subject user and link users sharing images with the subject user; and communities that the subject user belongs to. By this analysis, the image evaluation device 3B realizes image evaluation that better matches the needs of the subject user.

Specifically, the image evaluation device 3B recursively calculates an eigenvector of the adjacency matrix M showing the relationship among the elements, and thereby propagates the importance between the communities, between the users, between the images and between the image feature groups. Consequently, the image evaluation device 3B gives great importance to the link users belonging to many of the communities that the subject user belongs to, and to the link users whose evaluation results have a similar trend to those of the subject user. Accordingly, the image evaluation device 3B gives high evaluation results evaluated by such important users, in addition to the images evaluated by the subject user. Furthermore, the image evaluation device 3B gives great importance to the clusters of the image features contained in the images evaluated by the subject user and the images evaluated by important users. Accordingly, the image evaluation device 3B gives high evaluation results containing image features belonging to important image feature groups, in addition to the images evaluated by the subject user.

Figure 34:
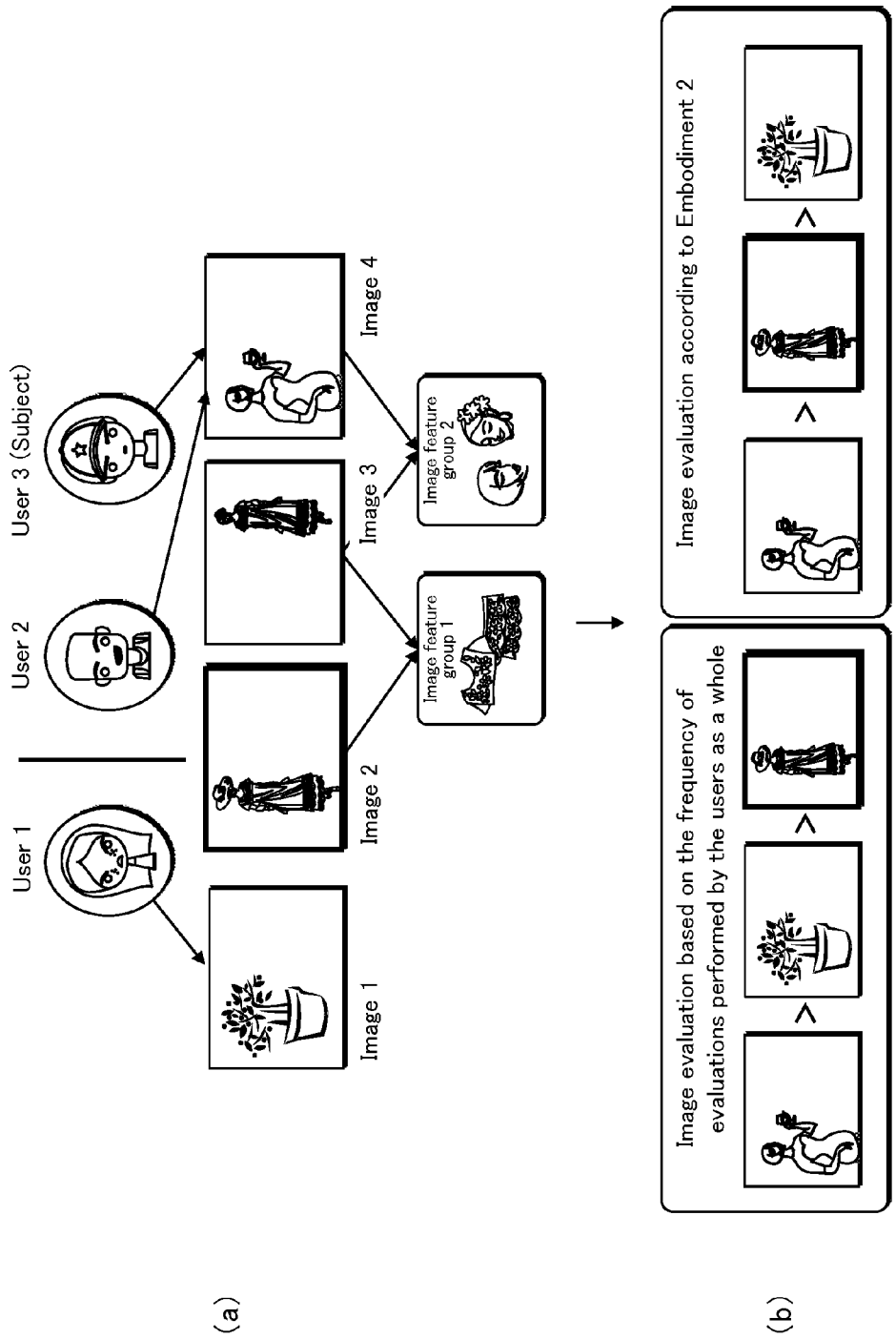
FIG. 34 shows an example of image ranking pertaining to Embodiment 2.

The following describes an effect of the image evaluation pertaining to Embodiment 2 in comparison with the image evaluation pertaining to conventional image evaluation based on the frequency of the image evaluations by the users as a whole, with reference to the specific example shown in FIG. 3. Suppose the case shown in Section (a) of FIG. 34, where the user 3 is the subject user, the user 4 is a user whose evaluation results have a similar trend to those of the subject user, and the users 1 through 3 have evaluated the images 1 through 4 containing image features belonging to the image feature groups 1 and 2. Note that the figures of a woman shown in the images 2 through 4 are of the same person. For the sake of simplification of the explanation of the effects of the image evaluation pertaining to Embodiment 2, the following discusses the rating of three images, the images 1, 2 and 4.

First, according to the image evaluation based on the frequency of the evaluations, the ratings of the three images will be: Image 4>Image 1>Image 2 (Left part of Section (b) of FIG. 34). The image 4 containing the woman evaluated by the subject user will be rated high. However, the image 2 containing the same woman with a hat will be rated low. This is because the image feature corresponding to the woman's face cannot be extracted due to the hat, and also because no user has evaluated the image 2.

In contrast, according to the image evaluation pertaining to Embodiment 2, the ratings of the images will be: Image 4>Image 2>Image 1 (Right part of Section (b) of FIG. 34). First, the image 3 is rated high, because the image feature belonging to the image feature group 2 and corresponding to the face of the woman contained in the image 4 evaluated by the user 3 is also contained in the image 3. Furthermore, the image 2 will be rated high, because the image feature belonging to the image feature group 1 and corresponding to the cloth of the woman contained in the image 3 is also contained in the image 2. Therefore, the image 2 can be rated higher than the image 1 (Right part of Section (b) of FIG. 34).

3. Modification Examples

Embodiments of the present invention have been described above as image evaluation devices. The image evaluation devices may be modified as shown below, and the present invention is not limited to the embodiments described above.
(1) Structure of Links The image evaluation device 3B pertaining to Embodiment 2 performs the image evaluation for each user (for each user account), considering a plurality of communities on a social network. Therefore, in the graph generation (FIG. 24), the image evaluation device 3B pertaining to Embodiment 2 generates a graph having a quadruple link structure composed of community links between community nodes and user nodes, evaluation links between user nodes and image nodes, and image feature links between image nodes and image feature nodes.

However, if the image evaluation is to be performed for only a particular subject user belonging to a particular community, the community nodes may be removed from the quadruple link structure. If this is the case, the image evaluation may be performed by generating a graph for the subject user, having a triple link structure composed of evaluation links between user nodes and image nodes and image feature links between image nodes and image feature nodes. By changing the quadruple link structure to the triple link structure, it is possible to reduce the amount of calculation from the image evaluation pertaining to Embodiment 2, while keeping the effects of the co-appearance of the image feature groups.
(2) Evaluation Information According to Embodiments described above, the evaluation information acquisition unit 30 calculates evaluation values according to various rating systems as shown in FIG. 11, and thus acquires the evaluation information of each user. However, the evaluation information is not limited to such information. For example, the evaluation information acquisition unit 30 may acquire the evaluation information of each user by adding evaluation values related to the dates of the evaluations, i.e., evaluation values related to the freshness of the evaluations, to the evaluation values according to the rating systems shown in FIG. 11.

Section (a) of FIG. 35 shows example evaluation values related to the freshness of the evaluation. As shown in Section (a) in FIG. 35, the evaluation values may be set high for a more recent evaluation, with reference to the date of acquisition, by the evaluation information acquisition unit 30, of the evaluation information.

The following explains an example case where the evaluation information is generated by adding the evaluation values related to the freshness of the evaluations, as shown in Section (a) of FIG. 35, to the evaluation values according to the various rating systems shown in FIG. 11.

As shown in Section (b) of FIG. 35, assume the case where the evaluation information is acquired at the current time, and a user gave a rating of "3" to an image on a scale of zero to five, within two years before the current time. As shown in Section (a) of FIG. 35, the additional evaluation value for an evaluation performed at a time point no earlier than two years ago is "10". Therefore, the evaluation value contained in the evaluation information of the user will be 3+10. Similarly, as shown in Section (b) of FIG. 35, assume the case where a user gave a rating of "1" to an image on a scale of zero to one at a time point more than 10 years earlier than the current time. As shown in Section (a) of FIG. 35, the additional evaluation value for an evaluation performed at a time point earlier than 10 years ago is "0". Therefore, the evaluation value contained in the evaluation information of the user will be 1+0=1.

In this way, by setting the evaluation values high for a more recent evaluation with reference to the date of acquisition of the evaluation information, the image evaluation devices pertaining to the embodiments described above can dominantly reflect the results of user's image evaluations performed in the recent past to the image evaluation for the subject user, compared to the results of user's image evaluations performed in the distant past.
(3) Integrated Circuit The image evaluation devices pertaining to the embodiments of the present invention may be typically implemented as an LSI (Large Scale Integration), which is a type of integrated circuit. Each of the circuits may be separately integrated into a single chip, or the circuits may be integrated into a single chip including a part or all of the circuits. Although referred to here as an LSI, depending on the degree of integration, the terms IC (Integrated Circuit), system LSI, super LSI, or ultra LSI are also used. In addition, the method for assembling integrated circuits is not limited to a LSI, and a dedicated communication circuit or a general-purpose processor may be used. An FPGA (Field Programmable Gate Array), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(4) Program

It is possible to distribute a control program composed of program code for causing processors of various devices, including computers, and various circuits connected to the processors to execute the image evaluation performed by the image evaluation devices pertaining to the embodiments. The distribution of such a control program may be realized by recording the control program onto recording media, or by transmission via various communication channels. The recording media which may be used in the distribution of the control program include such recording media as: a Smart Media; a Compact Flash™; a Memory Stick™; an SD memory card; a multimedia card; a CD-R/RW; a DVD±R/RW; a DVD-RAM; an HD-DVD; and a BD (Blu-ray Disc™). The distributed control program is used by being stored on a processor-readable memory or the like and executed by the processor in order to achieve the various functions described in the embodiments.

4. Supplementary Explanation

The following explains the structure of an image evaluation device, an image evaluation method, a program and an integrated circuit as embodiments of the present invention, and also explains the effects of modification examples.

(A) An image evaluation device pertaining to one aspect of the present invention is an image evaluation device comprising: an image feature extraction unit that extracts image features from a plurality of images; an evaluation information acquisition unit that acquires evaluation information, the evaluation information containing results of evaluations of the images performed by users including a subject user; a generation unit that generates relational information based on the image features and the evaluation information, the relational information showing relationship between the images, the users, and image feature groups into which the image features are classified; and an image social importance calculation unit that calculates an image social importance degree of each image based on the relational information generated by the generation unit, each image social importance degree showing a degree of importance to the subject user of the corresponding image.

With the stated structure, the image evaluation device generates information showing the relationship between the images, users, and the image feature groups according to the image features and the evaluation information, and evaluates the images based on the information thus generated. Therefore, the image evaluation device realizes image evaluation that matches the needs of the subject user.

(B) In the image evaluation device described in (A) above, the relational information generated by the generation unit may be composed of image feature group importance degrees, each image feature group importance degree showing a degree of importance to the subject user of the corresponding image feature group.

(C) In the image evaluation device described in (B) above, the generation unit may calculate each image feature group importance degree based on, among the results of the evaluations contained in the evaluation information, results of evaluations of images containing any image feature belonging to the corresponding image feature group.

(D) In the image evaluation device described in (C) above, the evaluation information may contain evaluation numbers respectively corresponding to the image feature groups, each evaluation number indicating the number of evaluations performed by any of the users on images containing any image feature belonging to the corresponding image feature group, and the image social importance calculation unit may calculate the image social importance degree of each image based on a sum of the image feature group importance degrees of the image feature groups that the image features contained in the corresponding image belong to.

With the stated structure, the image evaluation device can perform image evaluation that better matches the needs of each individual user.

(E) The image evaluation device described in (C) above may further comprise: an evaluation feature calculation unit that calculates an evaluation feature of each user based on the evaluation information, each evaluation feature showing a trend in results of evaluations performed by the corresponding user; and an evaluation trend similarity calculation unit that calculates an evaluation trend similarity degree for each user based on the evaluation feature of the corresponding user and the evaluation feature of the subject user, each evaluation trend similarity degree showing a degree of similarity between the trend of the corresponding user and the trend of the subject user, wherein the generation unit may calculate each image feature group importance degree based on the evaluation trend similarity degree of each user who has evaluated images containing any image feature belonging to the corresponding image feature group.

With the stated structure, the image evaluation device can perform image evaluation that better matches the needs of each individual user.

(F) The image evaluation device described in (E) above may further comprise: an image feature occupancy calculation unit that calculates an image feature occupancy degree of each image feature, each image feature occupancy degree showing a ratio of an area of the corresponding image feature to an area of the image from which the corresponding image feature has been extracted, wherein the image social importance calculation unit may calculate the image social importance degree of each image based on the image feature group importance degrees of the image feature groups that the image features contained in the corresponding image belong to.

With the stated structure, the image evaluation device can perform image evaluation that better matches the needs of each individual user.

(G) In the image evaluation device described in (F) above, the evaluation information may contain evaluation numbers respectively corresponding to the image feature groups, each evaluation number indicating the number of evaluations performed by any of the users on images containing any image feature belonging to the corresponding image feature group, and the generation unit may calculate each image feature group importance degree based on the evaluation trend similarity degree of each user who has evaluated images containing any image feature belonging to the corresponding image feature group, and the evaluation number of the corresponding image feature group.

With the stated structure, the image evaluation device can perform image evaluation that better matches the needs of each individual user.

(H) In the image evaluation device described in (E) above, the results of the evaluations of each image may be based on at least one of user operations including an operation of browsing the corresponding image, an operation of magnifying a part of the corresponding image, an operation of commenting on the corresponding image, and an operation of tagging the corresponding image.

With the stated structure, the image evaluation device can perform image evaluation that better matches the needs of each individual user.

(I) In the image evaluation device described in (H) above, the results of the evaluations of each image may additionally be based on the time at which said at least one of the user operations was performed.

With the stated structure, the image evaluation device can perform image evaluation that better matches the needs of each individual user.

(J) In the image evaluation device described in (A) above, the relational information generated by the generation unit may be a graph including nodes representing the images, the users and the image feature groups.

(K) The image evaluation device described in (A) above may further comprise: an image feature occupancy calculation unit that calculates an image feature occupancy degree of each image feature, each image feature occupancy degree showing a ratio of an area of the corresponding image feature to an area of the image from which the corresponding image feature has been extracted, wherein the generation unit may include: a node generator that generates nodes based on community elements representing communities that the users belong to, user elements representing the users, image elements representing the images, and image feature group elements representing the image feature groups; a community link setter that sets community links between nodes corresponding to the community elements and nodes corresponding to the user elements based on a relationship between the communities and the users; an evaluation link setter that sets evaluation links between nodes corresponding to the user elements and nodes corresponding to the image elements based on the evaluation information; an image feature link setter that sets image feature links between nodes corresponding to the image elements and nodes corresponding to the image feature group elements based on each image feature occupancy degree; and an adjacency matrix generator that generates an adjacency matrix representing the graph based on the community links, the evaluation links and the image feature links, wherein the image evaluation device may further comprise: an eigenvector calculation unit that calculates a dominant eigenvector of the adjacency matrix, wherein the image social importance calculation unit may calculate the image social importance degrees of each image based on an element representing the dominant eigenvector.

With the stated structure, the image evaluation device can perform image evaluation that matches the needs of the subject user by using a quadruple link structure composed of a community link, an evaluation link and an image feature link.

(L) In the image evaluation device described in (K) above, the community link setter may set link values of the community links based on dependency between the communities and the users, the evaluation link setter may set link values of the evaluation links based on an evaluation relationship between the users and the images, and the image feature link setter may set link values of the image feature links based on dependency between the images and the image feature groups and on each image feature occupancy degree.

(M) In the image evaluation device described in (L) above, the community link setter may set the link values of the community links such that importance of each user element propagates among the user elements via the community elements, the image feature link setter may set the link values of the evaluation links such that importance of each image element propagates among the image elements via the user elements, and the image feature link setter may set the link values of the image feature links such that importance of each image element propagates via the image feature group elements.

(N) An image evaluation method pertaining to one aspect of the present invention is an image evaluation method comprising: an image feature extraction step of extracting image features from a plurality of images; an evaluation information acquisition step of acquiring evaluation information, the evaluation information containing results of evaluations of the images performed by users including a subject user; a generation step of generating relational information based on the image features and the evaluation information, the relational information showing relationship between the images, the users, and image feature groups into which the image features are classified; and an image social importance calculation step of calculating an image social importance degree of each image based on the relational information generated by the generation unit, each image social importance degree showing a degree of importance to the subject user of the corresponding image.

With the stated structure, the image evaluation method generates information showing the relationship between the images, users, and the image feature groups according to the image features and the evaluation information, and evaluates the images based on the information thus generated. Therefore, the image evaluation method realizes image evaluation that matches the needs of the subject user.

(O) A program pertaining to one aspect of the present invention is a program for causing a computer to execute image evaluation processing comprising: an image feature extraction step of extracting image features from a plurality of images; an evaluation information acquisition step of acquiring evaluation information, the evaluation information containing results of evaluations of the images performed by users including a subject user; a generation step of generating relational information based on the image features and the evaluation information, the relational information showing relationship between the images, the users, and image feature groups into which the image features are classified; and an image social importance calculation step of calculating an image social importance degree of each image based on the relational information generated by the generation unit, each image social importance degree showing a degree of importance to the subject user of the corresponding image.

With the stated structure, the program generates information showing the relationship between the images, users, and the image feature groups according to the image features and the evaluation information, and evaluates the images based on the information thus generated. Therefore, the program realizes image evaluation that matches the needs of the subject user.

(P) An integrated circuit pertaining to one aspect of the present invention is an integrated circuit comprising: an image feature extraction unit that extracts image features from a plurality of images; an evaluation information acquisition unit that acquires evaluation information, the evaluation information containing results of evaluations of the images performed by users including a subject user; a generation unit that generates relational information based on the image features and the evaluation information, the relational information showing relationship between the images, the users, and image feature groups into which the image features are classified; and an image social importance calculation unit that calculates an image social importance degree of each image based on the relational information generated by the generation unit, each image social importance degree showing a degree of importance to the subject user of the corresponding image.

With the stated structure, the integrated circuit generates information showing the relationship between the images, users, and the image feature groups according to the image features and the evaluation information, and evaluates the images based on the information thus generated. Therefore, the integrated circuit realizes image evaluation that matches the needs of the subject user.

INDUSTRIAL APPLICABILITY

According to the image evaluation pertaining to the present invention, each user can efficiently browse personally important images among a vast number of images shared on a social network. Therefore, compared to the case of conventional image evaluation technologies based on the frequency of image evaluations, the users can more easily browse the images, without burden.

For example, on a social network, images related to recent events happened to link users such as of friends of the subject user's can be displayed in the order of the ratings of the images given by the subject user, instead of in the normal temporal sequence. As a result, the user can more efficiently browse the images and be informed of recent events happened to the link users. Therefore, the present invention is helpful when used in the use in stationary devices such as personal computers, portable devices such as smartphones, and sever devices for operating social networks, for example.

REFERENCE SIGNS LIST 1A, 1B: image evaluation system
2: network
3A, 3B: image evaluation device
4: display
10: image acquisition unit
20: image feature group extraction unit
21: image feature extractor
22: image feature occupancy calculator
23: image feature clusterer
30: evaluation information acquisition unit
40: evaluation feature calculation unit
50: evaluation trend similarity calculation unit
60: image evaluation unit
61: image feature group importance calculator
62: image social importance calculator
63: adjacency matrix generator
64: eigenvector calculator
70: storage unit
71: image feature occupancy calculator
72: image feature group management information storage
73: evaluation information storage
74: evaluation feature storage
75: evaluation trend similarity storage
76: image feature group importance storage
77: image social importance storage
78: graph storage
80: graph generating unit
81: node generator
82: community link setter
83: evaluation link setter
84: image feature link setter
85: dummy link setter
90: display control unit

The invention claimed is:

1. An image evaluation device comprising:
an image feature extraction unit that extracts image features from a plurality of images;
an evaluation information acquisition unit that acquires evaluation information, the evaluation information containing results of evaluations of the images performed by users including a subject user;
a generation unit that generates relational information based on the image features and the evaluation information, the relational information showing relationship between the images, the users, and image feature groups into which the image features are classified, the relational information including image feature group importance degrees; and
an image social importance calculation unit that calculates an image social importance degree of each image based on the relational information generated by the generation unit, each image social importance degree showing a degree of importance to the subject user of the corresponding image,
wherein the evaluation information contains evaluation numbers respectively corresponding to the image feature groups, each evaluation number indicating the number of evaluations performed by any of the users on images containing any image feature belonging to the corresponding image feature group, and
the image social importance calculation unit calculates the image social importance degree of each image based on a sum of the image feature group importance degrees of the image feature groups that the image features contained in the corresponding image belong to.

2. The image evaluation device of claim 1, wherein each image feature group importance degree showing a degree of importance to the subject user of the corresponding image feature group.

3. The image evaluation device of claim 2, wherein the generation unit calculates each image feature group importance degree based on, among the results of the evaluations contained in the evaluation information, results of evaluations of images containing any image feature belonging to the corresponding image feature group.

4. The image evaluation device of claim 3, further comprising:
an evaluation feature calculation unit that calculates an evaluation feature of each user based on the evaluation information, each evaluation feature showing a trend in results of evaluations performed by the corresponding user; and
an evaluation trend similarity calculation unit that calculates an evaluation trend similarity degree for each user based on the evaluation feature of the corresponding user and the evaluation feature of the subject user, each evaluation trend similarity degree showing a degree of similarity between the trend of the corresponding user and the trend of the subject user, wherein the generation unit calculates each image feature group importance degree based on the evaluation trend similarity degree of each user who has evaluated images containing any image feature belonging to the corresponding image feature group.

5. The image evaluation device of claim 4, further comprising:

an image feature occupancy calculation unit that calculates an image feature occupancy degree of each image feature, each image feature occupancy degree showing a ratio of an area of the corresponding image feature to an area of the image from which the corresponding image feature has been extracted, wherein the image social importance calculation unit calculates the image social importance degree of each image based on the image feature group importance degrees of the image feature groups that the image features contained in the corresponding image belong to.

6. The image evaluation device of claim 5, wherein the evaluation information contains evaluation numbers respectively corresponding to the image feature group, each evaluation number indicating the number of evaluations performed by any of the users on images containing any image feature belonging to the corresponding image feature group, and the generation unit calculates each image feature group importance degree based on the evaluation trend similarity degree of each user who has evaluated images containing any image feature belonging to the corresponding image feature group, and the evaluation number of the corresponding image feature group.

7. The image evaluation device of claim 4, wherein the results of the evaluations of each image are based on at least one of user operations including an operation of browsing the corresponding image, an operation of magnifying a part of the corresponding image, an operation of commenting on the corresponding image, and an operation of tagging the corresponding image.

8. The image evaluation device of claim 7, wherein the results of the evaluations of each image are additionally based on the time at which said at least one of the user operations was performed.

9. The image evaluation device of claim 1, wherein the relational information generated by the generation unit is a graph including nodes representing the images, the users and the image feature groups.

10. The image evaluation device of claim 1, further comprising:

an image feature occupancy calculation unit that calculates an image feature occupancy degree of each image feature, each image feature occupancy degree showing a ratio of an area of the corresponding image feature to an area of the image from which the corresponding image feature has been extracted, wherein the generation unit includes:

a node generator that generates nodes based on community elements representing communities that the users belong to, user elements representing the users, image elements representing the images, and image feature group elements representing the image feature groups;

a community link setter that sets community links between nodes corresponding to the community elements and nodes corresponding to the user elements based on a relationship between the communities and the users;

an evaluation link setter that sets evaluation links between nodes corresponding to the user elements and nodes corresponding to the image elements based on the evaluation information;

an image feature link setter that sets image feature links between nodes corresponding to the image elements and nodes corresponding to the image feature group elements based on each image feature occupancy degree; and an adjacency matrix generator that generates an adjacency matrix representing the graph based on the community links, the evaluation links and the image feature links, wherein the image evaluation device further comprises:

an eigenvector calculation unit that calculates a dominant eigenvector of the adjacency matrix, wherein the image social importance calculation unit calculates the image social importance degrees of each image based on an element representing the dominant eigenvector.

11. The image evaluation device of claim 10, wherein the community link setter sets link values of the community links based on dependency between the communities and the users, the evaluation link setter sets link values of the evaluation links based on an evaluation relationship between the users and the images, and the image feature link setter sets link values of the image feature links based on dependency between the images and the image feature groups and on each image feature occupancy degree.

12. The image evaluation device of claim 11, wherein the community link setter sets the link values of the community links such that importance of each user element propagates among the user elements via the community elements, the image feature link setter sets the link values of the evaluation links such that importance of each image element propagates among the image elements via the user elements, and the image feature link setter sets the link values of the image feature links such that importance of each image element propagates via the image feature group elements.

13. An image evaluation method comprising:

an image feature extraction step of extracting image features from a plurality of images;

an evaluation information acquisition step of acquiring evaluation information, the evaluation information containing results of evaluations of the images performed by users including a subject user;

a generation step of generating relational information based on the image features and the evaluation information, the relational information showing relationship between the images, the users, and image feature groups into which the image features are classified, the relational information including image feature group importance degrees; and an image social importance calculation step of calculating an image social importance degree of each image based on the relational information generated by the generation unit, each image social importance degree showing a degree of importance to the subject user of the corresponding image, wherein the evaluation information contains evaluation numbers respectively corresponding to the image feature groups, each evaluation number indicating the number of evaluations performed by any of the users on images ma e feature belonging to the corresponding image feature group, and the image social importance calculation step calculates the image social importance degree of each image based on a sum of the image feature group importance degrees of the image feature groups that the image features contained in the corresponding image belong to.

14. A non-transitory computer-readable medium having stored thereon a program for causing a computer to execute image evaluation processing comprising:

an image feature extraction step of extracting image features from a plurality of images;

an evaluation information acquisition step of acquiring evaluation information, the evaluation information containing results of evaluations of the images performed by users including a subject user;

a generation step of generating relational information based on the image features and the evaluation information, the relational information showing relationship between the images, the users, and image feature groups into which the image features are classified, the relational information including image feature group importance degrees; and an image social importance calculation step of calculating an image social importance degree of each image based on the relational information generated by the generation unit, each image social importance degree showing a degree of importance to the subject user of the corresponding image, wherein the evaluation information contains evaluation numbers respectively corresponding to the image feature groups, each evaluation number indicating the number of evaluations performed by any of the users on images containing any image feature belonging to the corresponding image feature group, and the image social importance calculation step calculates the image social importance degree of each image based on a sum of the image feature group importance degrees of the image feature groups that the image features contained in the corresponding image belong to.

15. An integrated circuit comprising:

an image feature extraction unit that extracts image features from a plurality of images;

an evaluation information acquisition unit that acquires evaluation information, the evaluation information containing results of evaluations of the images performed by users including a subject user;

a generation unit that generates relational information based on the image features and the evaluation information, the relational information showing relationship between the images, the users, and image feature groups into which the image features are classified, the relational information including image feature group importance degrees; and an image social importance calculation unit that calculates an image social importance degree of each image based on the relational information generated by the generation unit, each image social importance degree showing a degree of importance to the subject user of the corresponding image, wherein the evaluation information contains evaluation numbers respectively corresponding to the image feature groups, each evaluation number indicating the number of evaluations performed by any of the users on images containing any image feature belonging to the corresponding image feature group, and the image social importance calculation unit calculates the image social importance degree of each image based on a sum of the image feature group importance degrees of the image feature groups that the image features contained in the corresponding image belong to.

\* \* \* \* \*